(12) United States Patent
Heredia et al.

(10) Patent No.: US 7,894,837 B2
(45) Date of Patent: *Feb. 22, 2011

(54) INSTANT MESSAGING TERMINAL ADAPTED FOR WIRELESS COMMUNICATION ACCESS POINTS

(75) Inventors: Rafael Heredia, Easley, SC (US); Frank U. Greer, IV, Greenville, SC (US); Michael P. Dean, Easley, SC (US)

(73) Assignee: Zipit Wireless, Inc., Greenville, SC (US)

( * ) Notice: Subject to any disclaimer, the term of this patent is extended or adjusted under 35 U.S.C. 154(b) by 635 days.

This patent is subject to a terminal disclaimer.

(21) Appl. No.: 11/973,020

(22) Filed: Oct. 5, 2007

(65) Prior Publication Data

US 2009/0093264 A1 Apr. 9, 2009

(51) Int. Cl.
*H04Q 7/20* (2006.01)
(52) U.S. Cl. .................. 455/466; 455/41.2; 455/3.01; 455/3.05; 455/3.06; 455/507; 455/513; 455/566; 455/90.1; 455/90.2; 709/206
(58) Field of Classification Search ......... 455/410–411, 455/414.1–414.4, 41.1–41.2, 550.1, 566, 455/575.1, 90.1–90.2, 466, 3.01–3.06, 412.1–412.2, 455/507–514, 556.1–556.2, 557; 379/433.01, 379/433.06, 433.07; 709/204–207
See application file for complete search history.

(56) References Cited

U.S. PATENT DOCUMENTS 6,332,077 B1 * 12/2001 Wu et al. .................. 455/432.1

(Continued)

FOREIGN PATENT DOCUMENTS

WO WO 01/41477 6/2001

OTHER PUBLICATIONS

"Motorola IMfree", Motorola, Web page, May 8, 2003. (1 page).

(Continued)

*Primary Examiner*—Tuan A Tran
(74) *Attorney, Agent, or Firm*—Maginot, Moore & Beck LLP

(57) ABSTRACT

A handheld instant messaging terminal manages multiple conversation sessions across multiple instant messaging services. The handheld terminal includes a handheld terminal housing, a data entry device integrated in the terminal housing, the data entry device generates textual characters and graphical symbols in response to actuation of the data entry device, a display mounted in the terminal housing to display textual characters and graphical symbols including the textual characters and graphical symbols generated by the data entry device, an Internet protocol communications module located within the handheld terminal housing to generate instant messaging (IM) data messages in an Internet protocol that include the textual characters and graphical symbols generated by the data entry device, a wireless transceiver mounted within the handheld terminal housing and coupled to the Internet protocol communications module to generate wireless data messages corresponding to the IM data messages that radiate from an antenna coupled to the wireless transceiver, and a control module located within the housing and coupled to the Internet protocol communications module, the control module including at least one processor that executes an application program to implement instant messaging and session protocols for IM data messages communicated during at least one conversation session through the Internet protocol communications module and the wireless transceiver.

20 Claims, 14 Drawing Sheets

U.S. PATENT DOCUMENTS

| | | | |
|---|---|---|---|
| 6,484,196 B1 * | 11/2002 | Maurille | 709/206 |
| 6,539,421 B1 * | 3/2003 | Appelman et al. | 709/206 |
| 6,629,793 B1 * | 10/2003 | Miller | 400/472 |
| 6,636,419 B2 | 10/2003 | Duarte | |
| 6,665,173 B2 | 12/2003 | Brandenberg et al. | |
| 6,671,351 B2 * | 12/2003 | Menard et al. | 379/45 |
| 2003/0065955 A1 * | 4/2003 | Kumhyr et al. | 713/202 |
| 2003/0073462 A1 | 4/2003 | Zatloukal et al. | |
| 2003/0083047 A1 * | 5/2003 | Phillips et al. | 455/412 |
| 2003/0130014 A1 * | 7/2003 | Rucinski | 455/566 |
| 2003/0140103 A1 * | 7/2003 | Szeto et al. | 709/206 |
| 2004/0145608 A1 * | 7/2004 | Fay et al. | 345/758 |

OTHER PUBLICATIONS

"New Motorola IMfree Delivers Portable Instant Messaging Solution to Millions of AOL Instant Messenger Fans", Motorola, Inc., May 7, 2003. (3 pages).

"Motorola IMfree", Web page, May 8, 2003. (3 pages).

"WaveLAN™ WL1141 Single-Component 802.11b Physical-Layer Solution", Agere Systems, Oct. 2003. (2 pages).

"FW802B Low-Power PHY IEEE® 1394A-2000 Two-Cable Transceiver/Arbiter Device", Agere Systems, Jul. 2002. (4 pages).

* cited by examiner

INSTANT MESSAGING TERMINAL ADAPTED FOR WIRELESS COMMUNICATION ACCESS POINTS

PRIORITY CLAIM

This invention claims priority from co-pending U.S. patent application Ser. No. 10/846,236, which is entitled "Instant Messaging Terminal Adapted For Wi-FI Access Points" and was filed on May 14, 2004, which claims priority from U.S. Provisional Patent Application Ser. No. 60/532,000, which was filed on Dec. 24, 2003.

TECHNICAL FIELD

This invention relates to handheld communication terminals and, more particularly, to handheld terminals used for instant messaging.

BACKGROUND

Instant messaging is used to describe a computer network service for the communication of textual messages between users in a real-time manner. Three major providers of instant messaging services are America On-Line Instant Messaging (AIM), Microsoft Network (MSN) Messenger, and Yahoo Instant Messenger. These providers enable subscribers to access an instant messaging service through a subscriber's Internet service provider (ISP), if different from the instant message service provider. Consequently, an instant messaging subscriber uses a computer terminal executing an application program to couple to an ISP and then access an instant messaging service. Once the instant messaging service is accessed, the user may query the service for identification of the "buddies" that are currently accessing the instant messaging service provider. "Buddies" are other subscribers to the instant messaging service that a subscriber has identified by including them in his or her buddy list. A subscriber may then initiate an instant messaging session with a buddy by typing and addressing a textual/graphical message to one of the buddies on the messaging service. When the subscriber activates the sending function for the message, the messaging service communicates the message to a buddy and activates a notification feature, such as an audio file, to inform the buddy that a message has been received through the instant messaging service. The buddy may then view the message, type a response, and send it through the messaging service. The conversation may continue in this manner until one of the parties terminates the session.

Conversation sessions with multiple buddies at substantially the same time may be conducted by an instant messaging subscriber. U.S. Pat. No. 6,539,421 describes the problems associated with the management and display of multiple conversation sessions on an instant messaging terminal. Among the issues that need to be addressed is the need for navigating between message windows because separate message windows are used for different conversation sessions. Consequently, a subscriber needs to be able to identify a conversation session in a window so the subscriber can respond appropriately to the conversation displayed in the window.

Communication terminals for receiving textual and graphic messages are well-known. These terminals include cellular telephones, two-way pagers, personal digital assistants (PDAs), and handheld computers, which are commonly known as palmtop computers. The limitations of these devices for instant messaging are discussed in U.S. Pat. No. 6,665,173. In brief, these devices are either limited in their textual and graphical character entry systems, unable to provide display access when the device is in an inactive state, or difficult to manipulate for data entry without platform support for the keyboard. Consequently, U.S. Pat. No. 6,665,173 discloses an instant messaging terminal with an integrated keyboard and display that is not enclosed in a clamshell case when the terminal is in an inactive state.

Wireless fidelity communication, or Wi-Fi, as it is also known, is increasing in popularity. In particular, retail establishments are providing Wi-Fi access points so customers can couple to an ISP while enjoying a beverage at the establishment. The access point includes a radio transceiver coupled to a server that typically implements the 802.11b, 802.11a, or 802.11g communication standard. Locations providing wireless access points for the Internet are commonly referred to as "hotspots." These hotspots are local area networks (LANs) and devices on such a LAN may be coupled to the Internet. The provision of wireless Internet access can be an important draw for an establishment, such as a coffee shop or the like. However, the access point must be implemented with care to reduce the risk that unscrupulous computer users will attempt Internet access through the access point for the purposes of web site hacking with an enhanced degree of anonymity. Design aspects considered in the implementation of a hotspot include the radius in which the transceiver effectively communicates and the security scheme that allows a customer to use an access point. Typically, the transmission power of the transceiver is limited to a level so the radiation pattern does not extend past the boundaries of the commercial premises to reduce the risk of unobserved access to the local network through the access point. Additionally, a security method, such as Wired Equivalent Privacy (WEP) or Wi-Fi Protected Access (WPA), is implemented by the access point components to determine whether Internet access is granted through the access point.

Not only is Wi-Fi used in the implementation of hotspots for commercial establishments but it is also used in homes as well. Such usage typically requires a Wi-Fi radio transceiver and router in a home or small office that wirelessly communicates with computers located in the home or office. The Wi-Fi router may also be used as an access point to the Internet. By using a Wi-Fi router, computers in the home or office are coupled together in a LAN without requiring cables to be coupled between the computers and the router for communication purposes. The range of the Wi-Fi transceiver and router is important to avoid eavesdropping on electronic communications within the home or office as well as to reduce the likelihood of unauthorized access to the Internet through the Wi-Fi router. Larger businesses may use multiple hotspots to provide coverage of a large building so communication devices within operating range of a Wi-Fi transceiver enable a person to remain accessible throughout the business premises.

Instant messaging is an increasingly popular service that is exploited at Wi-Fi hotspots and home locations. Instant messaging subscribers may access their instant messaging services through a hotspot or home/business Wi-Fi router to conduct communication sessions with buddies. That is, a subscriber may access the Internet at a hotspot, home, or business to converse with one or more buddies through an instant messaging service. However, efficient utilization of Wi-Fi access points is encumbered by a number of disadvantages with existing equipment. For one, most instant messaging is still implemented with portable computers that require some form of luggage for transportation. The smaller communication devices, such as PDAs, palm computers, and two-way pagers, suffer from the textual/graphical data entry issues discussed in U.S. Pat. No. 6,665,173. For example, the keyboard especially designed for supporting instant messaging features in U.S. Pat. No. 6,629,793 is either integrated in a regular sized keyboard typically used with desktop computers or into a foldout keyboard that couples to a PDA for data entry. The desktop computer is not easily transportable to Wi-Fi hotspots and the foldout keyboard still requires a flat surface for support. The keyboard integrated in the instant messaging terminal shown in U.S. Pat. No. 6,665,173 does not incorporate any special keys that facilitate instant messaging. Because the instant messaging keys are separated from the standard keyboard section, the combination of an instant messaging keyboard with a standard keyboard would adversely impact the overall size of the instant messaging terminal. Furthermore, the communication module of that terminal is disclosed as being one that supports cellular radio communication only. Such a device would be inoperative in a Wi-Fi hotspot.

Another limitation of existing instant messaging terminals is the restriction of accessing only one instant messaging service provider at a time. Consequently, even though a person may subscribe to multiple instant messaging services, only one service may be accessed. This limitation means that a subscriber may only establish conversation sessions with buddies on the instant messaging service currently being accessed. Support of multiple services would require management of multiple buddy lists because each instant messaging service provider would provide a separate buddy list to the terminal to identify the subscriber's buddies currently accessing the instant messaging service. Furthermore, the instant messaging services require different keystrokes to generate some of the emoticons frequently encountered in instant messaging sessions. Emoticons are graphical symbols intended to convey emotional aspects of a message. For example, one instant messaging service may require the typing of the following characters :-) to generate the symbol ☺, while another instant messaging service may only require the typing of :) to generate the symbol ☺, which is typically known as the smiley face. Thus, support across multiple instant messaging services may require a subscriber to remember the requisite keystrokes for generating symbols within each messaging service as well as keeping track of each buddy list and the multiple conversation windows.

Another limitation of instant messaging terminals is the procedure for locating an access point and authenticating the device for obtaining access to the Internet. At many access points, the WiFi radio transceiver transmits a signal, sometimes called a beacon, that indicates an access point is within range of the terminal. Some beacons advertise, while others do not advertise. "Advertising" in this context means the beacon signal contains an identifier for the access point. An access point identifier is required for gaining Internet access through the Wi-Fi router. If a Wi-Fi radio transceiver does not advertise, then the terminal is expected to have obtained the access point identifier and have it programmed into its communication procedure. However, many instant messaging subscribers are not familiar with the authorization protocol and the information required by the access point in order to be granted Internet service. This lapse in knowledge is further compounded when the access point also implements a security feature such as WEP or WPA. For example, an access point implementing WEP requires that the terminal provide a key as well as the access point identifier so a user may know enough to enter the access point or network identifier but fail to recognize that access denial is being based on failure to provide the WEP key. Even if a terminal user knows how to enter the access point identifier and any security information into the terminal, subsequent attempts to gain access require the user to remember this data and enter it at the appropriate time.

Instant messaging is increasingly popular with younger users. These users typically prefer multiple media stimuli in their environment while multi-tasking. For example, they frequently listen to their own music while viewing videos, making telephone calls, and exchanging instant messages with buddies. When these users are situated in a Wi-Fi hotspot, their choice of music is limited to the music being played at the hotspot premises. Frequently, these users would prefer to have more options than those provided by the management of the hotspot premises.

What is needed is an instant messaging terminal that incorporates keys for facilitating instant messaging features without requiring a table or other platform structure for stability during data entry.

SUMMARY

The above limitations of previously known instant messaging terminals are overcome by an instant messaging terminal made in accordance with the principles of the present invention. The inventive instant messaging terminal includes a display having a capability for displaying textual characters and graphical symbols, a data entry device integrated in a housing for the instant messaging terminal, the data entry device being manipulated for entry of textual characters and graphical symbols, a Wi-Fi communications module for communicating messages with a Wi-Fi access point, and a control module for coordinating authorization for coupling the instant messaging terminal to a local network corresponding to the Wi-Fi access point and for controlling a conversation session through the Wi-Fi access point.

The data entry device that is integrated in the instant messaging terminal housing includes keys for graphical symbols, such as those typically seen in instant messages. The graphical symbol keys include indicia identifying the graphical symbol generated by depressing the key. Also, programmable keys are provided for which a user may define a set of characters corresponding to a graphical symbol supported by an instant messaging service provider. Thereafter, depressing the programmed key causes the character sequence for the graphical symbol to be generated. The graphical symbol generated by a programmable key is preferably displayed in an LCD segment located proximate the programmable keys. In response to the depression of a key for a graphical symbol, the control module determines the correct character sequence to transmit that generates the graphical symbol within the instant messaging service through which the message recipient is communicating. Thus, the user need not identify every character sequence required to generate the graphical symbol within every instant messaging service for which the user has an instant messaging service account.

The control module also coordinates the message sequence required for joining the local network through an access point. The control module communicates with the communications module to determine whether any beacons have been detected in the area of the instant messaging terminal. If more than one is detected, the one having the strongest signal is selected as a candidate for local network access. The control module determines whether the beacon is advertising its identifier. If it is and no security scheme is being implemented, then the control module obtains access to the local network through the access point. If the identifier is not being advertised, then the control module prompts the user for the network identifier and incorporates it within the authorization message to the access point. If a security scheme, such as WEP, is being implemented, then the user is prompted for the key and the key is used to complete the authorization process with the access point. Once access has been obtained, the profile of the access point is stored in the terminal. The profile includes the network identifier and the key, if a security scheme is implemented. Thereafter, the user may manually select the profile from a displayed list of profiles for manually connecting the terminal to a Wi-Fi hotspot. Also, the instant messaging terminal of the present invention automatically determines whether information in a detected beacon corresponds to a stored profile, and if it does, uses the information in the profile for coupling the terminal to the network automatically without user intervention.

Following access authorization, the control module may activate one or more instant messaging service accounts through the access point. For each service activated, the control module receives a buddy list identifying all of the terminal user's buddies that are currently logged onto the instant messaging service. If more than one instant messaging service is accessed, then the buddy lists are integrated so that the terminal user views a single list that identifies all the persons with whom the user may conduct conversation sessions. Preferably, the buddy list displays the buddies with whom active conversations are being conducted at the top of the list and those with whom no active conversation is being conducted are displayed lower in the list. The active conversation sessions are preferably displayed in the order in which the conversations were initiated. Preferably, one window is displayed at a time for each instant messaging conversation session. The window includes a header that identifies the buddy with whom the conversation is being conducted, the number of the window being displayed, and the total number of conversations that are active.

In response to the depression of the previous key on the terminal, the control module selects the conversation session that the user was displaying before going to the currently displayed conversation. In response to the next key, the control module displays a new conversation window for a session initiated by receipt of a new instant message. If a new instant message has not been received, then the next key causes the control module to display the conversation window with the next buddy in the buddy list, if an active conversation is being conducted with that buddy. Otherwise, the conversation for the oldest active conversation is displayed.

In accordance with the principles of the present invention, the control module manages conversation sessions with buddies across multiple messaging services. Thus, the control module parses the characters within a message generated by a user with the data entry device and confirms the sequence is compatible with the messaging service being used to conduct the conversation with the recipient buddy. If it is not compatible with the service, the control module determines the corresponding sequence for the symbol in the messaging service and substitutes that sequence in the message before transmitting the message to the access point for delivery to the messaging service. In this manner, the control module provides transparent support across multiple instant messaging services without requiring the terminal user to be knowledgeable of the different character sequences for graphical symbol generation in each of the instant messaging services with which the user has an account.

The Wi-Fi communications module enables the instant messaging terminal of the present invention to be used at Wi-Fi hotspots and in local networks that use a wireless router for communication. Such routers may use a communication protocol such as the 802.11b, 802.11a, or 802.11g protocols or the like. Coupled with the storage of network profiles, such a device may be transported from location to location where a Wi-Fi network is implemented so the user may quickly negotiate authorization with the access point and begin instant messaging with one's buddies. The data entry device having keys for graphical symbol generation as well as character generation makes conversation sessions with buddies across different messaging service platforms transparent. Conversation sessions with multiple buddies may be more easily managed using the buddy list that integrates the buddies from different service platforms in a single list based on the time for initiation of the conversation with each buddy.

An instant messaging terminal made in accordance with the principles of the present invention includes an audio player application. A user may invoke this application program to stream or download music files from Internet sites where music is stored or from music files stored on a user's PC or other music storage device. The files received from the Internet may be downloaded through the access point when the terminal is coupled to the Internet through a Wi-Fi access point. The files received from a PC may be streamed through the access point when the terminal is coupled to the PC through a Wi-Fi access point. Downloads from a user's PC or other storage device may be enabled by coupling the external device to the external peripheral bus of the terminal and invoking the audio player application program. Also, the audio player application program may stream or receive music files from Internet radio sites. These stored or downloaded files are decoded by the application program and converted by the D/A converter in the instant messaging terminal into analog electrical signals for driving the speakers of the messaging terminal. The audio player application may be invoked so it executes while the instant messaging application is also active. The processor of the terminal multi-tasks the applications so that the user is able to listen to stored and/or downloaded music files while exchanging instant messages with buddies.

A method that may be used to implement the principles of the present invention includes displaying textual characters and graphical symbols corresponding to the textual characters and graphical symbols in instant messages, manipulating a data entry device integrated in a housing for the instant messaging terminal for entry of textual characters and graphical symbols, communicating messages in a Wi-Fi communication scheme, coupling the instant messaging terminal to a local network through a Wi-Fi access point, and controlling a conversation session through the Wi-Fi access point.

The integration of the data entry device in the instant messaging terminal housing enables the textual characters and graphical symbols to be entered for instant messages without requiring platform support for a foldout keyboard or the like. The method may also include programming keys of the data entry device to define a set of characters corresponding to a graphical symbol supported by an instant messaging service provider. Thereafter, depressing the programmed key causes the character sequence for the graphical symbol to be generated. The method may include displaying the graphical symbol programmed for a key in an LCD segment located proximate the programmable keys. In response to the depression of a key for a graphical symbol, the method determines the correct character sequence to transmit that causes the recipient instant messaging service to generate the graphical symbol associated with the key. Thus, the user need not identify every character sequence required to generate the graphical symbol within every instant messaging service for which the user has an instant messaging service account.

The method of the present invention also coordinates the message sequence required for joining the local network through an access point. The coordination includes a determination as to whether any beacons have been detected in the area of the instant messaging terminal. If more than one is detected, the one having the strongest signal is selected as a candidate for local network access and the method determines whether the beacon is advertising its identifier. If it is and no security scheme is being implemented, then access to the local network through the access point is obtained. If the identifier is not being advertised, then the user is prompted for the network identifier and the identifier is incorporated within the authorization message to the access point. If a security scheme, such as WEP, is being implemented, then the user is prompted for the key and the key is used to complete the authorization process with the access point. Once access has been obtained, the profile of the access point is stored in the terminal. The storage of a network profile includes the network identifier and the key, if a security scheme is implemented. Thereafter, a terminal user may manually select the profile from a displayed list of profiles for manually connecting the terminal to a Wi-Fi hotspot. Also, the instant messaging terminal of the present invention automatically determines whether information in a detected beacon corresponds to a stored profile, and if it does, uses the information in the profile for coupling the terminal to the network automatically without user intervention.

Following access authorization, one or more instant messaging service accounts may be activated through the access point. For each service activated, a buddy list is received that identifies the terminal user's buddies that are currently logged onto the instant messaging service. If more than one instant messaging service is accessed, then the buddy list from each service is integrated into a master buddy list that may be displayed at the terminal. Thus, the terminal user is able to view a single list that identifies all the persons with whom the user may conduct conversation sessions. Preferably, the master buddy list displays the buddies with whom active conversations are being conducted at the top of the list and those with whom no active conversation is being conducted are displayed lower in the list. The active conversation sessions are preferably displayed in the order in which the conversations were initiated. Preferably, one window is displayed at a time for each instant messaging conversation session. The window includes a header that identifies the buddy with whom the conversation is being conducted, the number of the window being displayed, and the total number of conversations that are active.

In response to the depression of the <prev> key on the terminal, the conversation session is selected for display that the user was displaying before going to the currently displayed conversation. In response to the depression of the <next> key, the conversation session is selected for display that is in the queue after the currently displayed conversation. If a new instant message is received and the user wants to view the most recently received message, then the user depresses the <Ctrl><next> key sequence to view the conversation window displaying the most recently received message.

In accordance with the principles of the present invention, conversation sessions with buddies across multiple messaging services are managed. Thus, characters within a message generated by a user with the data entry device are parsed to confirm the sequence is compatible with the messaging service being used to conduct the conversation with the recipient buddy. If it is not compatible with the service, the corresponding sequence for the symbol in the messaging service is generated and substituted in the message before transmitting the message to the access point for delivery to the messaging service. In this manner, transparent support across multiple instant messaging services is provided without requiring the terminal user to be knowledgeable of the different character sequences for graphical symbol generation in each of the instant messaging services with which the user has an account.

Communication in the Wi-Fi communication protocol enables the method of the present invention to be used at Wi-Fi hotspots and in local networks that use a wireless router that may communicate using a known Wi-Fi protocol, such as the 802.11b, 802.11a, or 802.11g protocols, for example. Coupled with the storage of network profiles, a device implementing the method may be transported from location to location where a Wi-Fi network is implemented so the user may quickly negotiate authorization with the access point and begin instant messaging with one's buddies. The generation of graphical symbols as well as character generation makes conversation sessions with buddies across different messaging service platforms transparent to the user. Conversation sessions with multiple buddies may be more easily managed using the master buddy list that integrates the buddies from different service platforms in a single list based on the time for initiation of the conversation with each buddy.

An instant messaging method operating in accordance with the principles of the present invention includes playing audio files so a user may listen to music while exchanging instant messages with buddies. The audio file playing includes downloading music files from Internet sites where music is stored or from music files stored on a user's PC or other music storage device. The file downloading may be performed through the access point when the terminal is coupled to the Internet through a Wi-Fi access point or by coupling an external audio file storage device to the external peripheral bus of the terminal. Also, music may be generated from music files received from Internet radio sites. The generation of music at the instant messaging terminal includes decoding the stored or downloaded files and converting the digital data into analog electrical signals for driving the speakers of the messaging terminal. The music generation may be controlled by the processor of the terminal while instant messaging is also occurring. The processor of the terminal multi-tasks the applications performing the music generation and instant messaging so that the user is able to listen to stored and/or downloaded music files while exchanging instant messages with buddies.

Consequently, a system and method that operates in accordance with the principles of the present invention provides an instant messaging terminal that incorporates keys for facilitating instant messaging features without requiring a table or other platform structure for stability during data entry.

The above described features and advantages, as well as others, will become more readily apparent to those of ordinary skill in the art by reference to the following detailed description and accompanying drawings.

DETAILED DESCRIPTION

Figure 1:
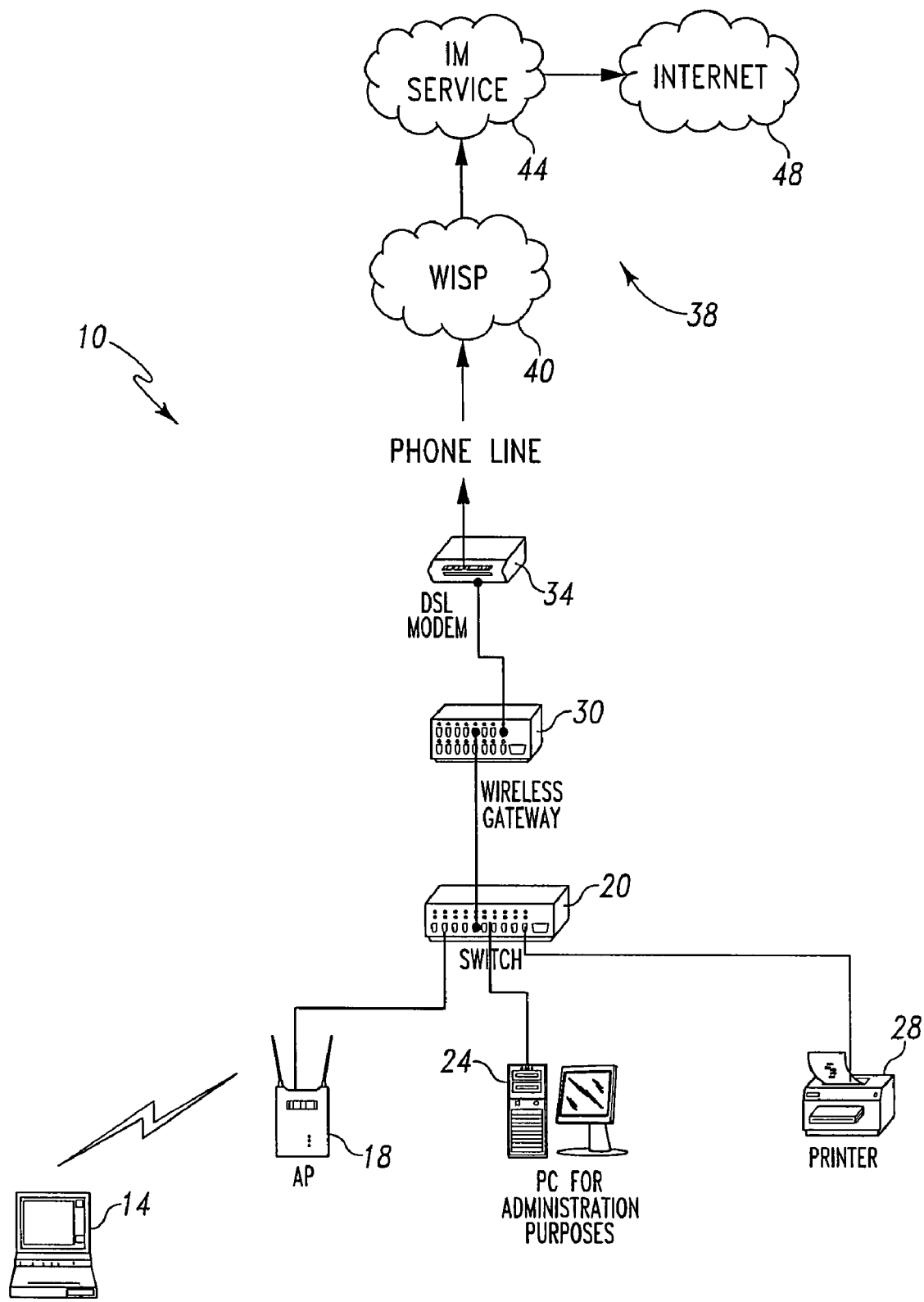
FIG. 1 is a diagram of an environment in which the instant messaging terminal of the present invention may be used.

FIG. 1 shows a Wi-Fi environment in which an instant messaging terminal that operates in accordance with the principles of the present invention may be used. The environment 10 includes an instant messaging terminal 14 that may wirelessly communicate with an access point 18 in accordance with one of the IEEE 801.11b, 801.11a, or 801.11 g standards, for example. The access point 10 communicates with a switch/hub 20 typically through wired communication. The switch/hub 20 may also be coupled to an administration computer 24 and a printer 28 for administration of the hotspot or local network components. The switch/hub 20 is coupled to a wireless gateway 30 for intelligent management of the traffic between the wide area network (WAN) 38 coupled to the wireless gateway through the DSL modem 34 or equivalent and the local area network coupled together through the access point 18 and switch/hub 20. WAN 38 may include a wireless internet service provider 40 that includes an instant messaging (IM) service 44 that communicates through the Internet 48 to other users on local networks similarly coupled to the Internet 48.

In more detail, the access point 18 provides wireless access to the LAN at the hot spot. The access point 18 broadcasts the wireless network parameters through a message known as a beacon. The message includes information regarding the characteristics of the wireless network. The beacon may include advertising, which means that the beacon message contains the service set identifier (SSID) for the wireless network. A beacon from an access point 18 may be requested by an instant messaging terminal 14 through a probe message or a request to join a LAN identified by a specific SSID. The access point 18 may implement a security scheme known as Wired Equivalent Privacy (WEP). WEP may be used for both terminal authentication and message encryption or message encryption only. If it is used for both authentication and message encryption, network authentication is known as pre-shared key authentication because the access point 18 and the message terminal 14 both share knowledge of the key. On the other hand, if the key is only used for message encryption, then the authentication is known as open authentication. Once the terminal 14 sends a message to the access point 14 indicating knowledge of the key in pre-shared key authentication, the device is considered authenticated and allowed access to the LAN. WEP does not support user authentication. After device authentication, the terminal 14 is able to associate with the access point 18 and communicate packets. Prior to association, packets addressed to other network components cannot get through the access point 18, even though management frames can be communicated between the access point 18 and the terminal 14. In most environments 10, the access point 18 is implemented with an access point that has been certified by the Wi-Fi Alliance, although other access points may be used with a terminal 14 made in accordance with the principles of the present invention.

The switch/hub 20 provides multiple ports for connecting the access point to the backhaul for the hotspot. Switch/hub 20 may be a simple hub or it may include components for a Virtual Local Area Network (VLAN) switch. A VLAN switch may be used to physically separate ports to isolate communication through the ports from one another, to couple two or more ports together, to route packets between ports based on Media Access Controller (MAC) addresses or Internet Protocol (IP) addresses, and/or tag packets in accordance with destination or source port designator, MAC address, or IP address.

The wireless gateway 30 implements a network access controller that uses smart filters to select the packets that are communicated through the wireless gateway. Typically, the wireless gateway is involved in user authentication for regulating access to the WAN 38 coupled to the wireless gateway 30 through the DSL modem or other telephone communication, such as a partial or full T1 or T3 link. The type of link coupling the LAN components to the WAN depends upon the largest number of terminals anticipated as being coupled to the access point 18 at a single time. The wireless gateway 30 may include or be coupled to an IP address allocation server. This server is sometimes known as a Dynamic Host Configuration Protocol (DHCP) server. Its function is to assign IP addresses so network components, such as the terminals 14 coupled to the access point 18 have unique IP addresses for communication. The IP addresses most likely assigned to terminals 14 coupled through the access point 18 are private IP addresses. These private IP addresses are typically mapped to a single public IP address by a network address/port translator that is a component of the wireless gateway 30. The network address/port translator is able to determine the corresponding private IP address for messages received from the WAN that only have the public IP address.

The wireless internet service provider 40 may be a component of an Internet service provider or it may be a service accessed through an Internet service provider. To support instant messaging, an instant messaging service 44 includes the components for routing messages between subscribers and administrating the accounts for the subscribers. For messages communicated to other instant message subscribers supported by other ISPs or WISPs, the messages are communicated over the Internet 48 to the WISP or ISP through which the subscriber reaches the IM service. A terminal 14 made in accordance with the principles of the present invention enables a terminal user to access multiple IM services through the access point 18 and communicate with multiple subscribers on different services during a single connection session.

Figure 2:
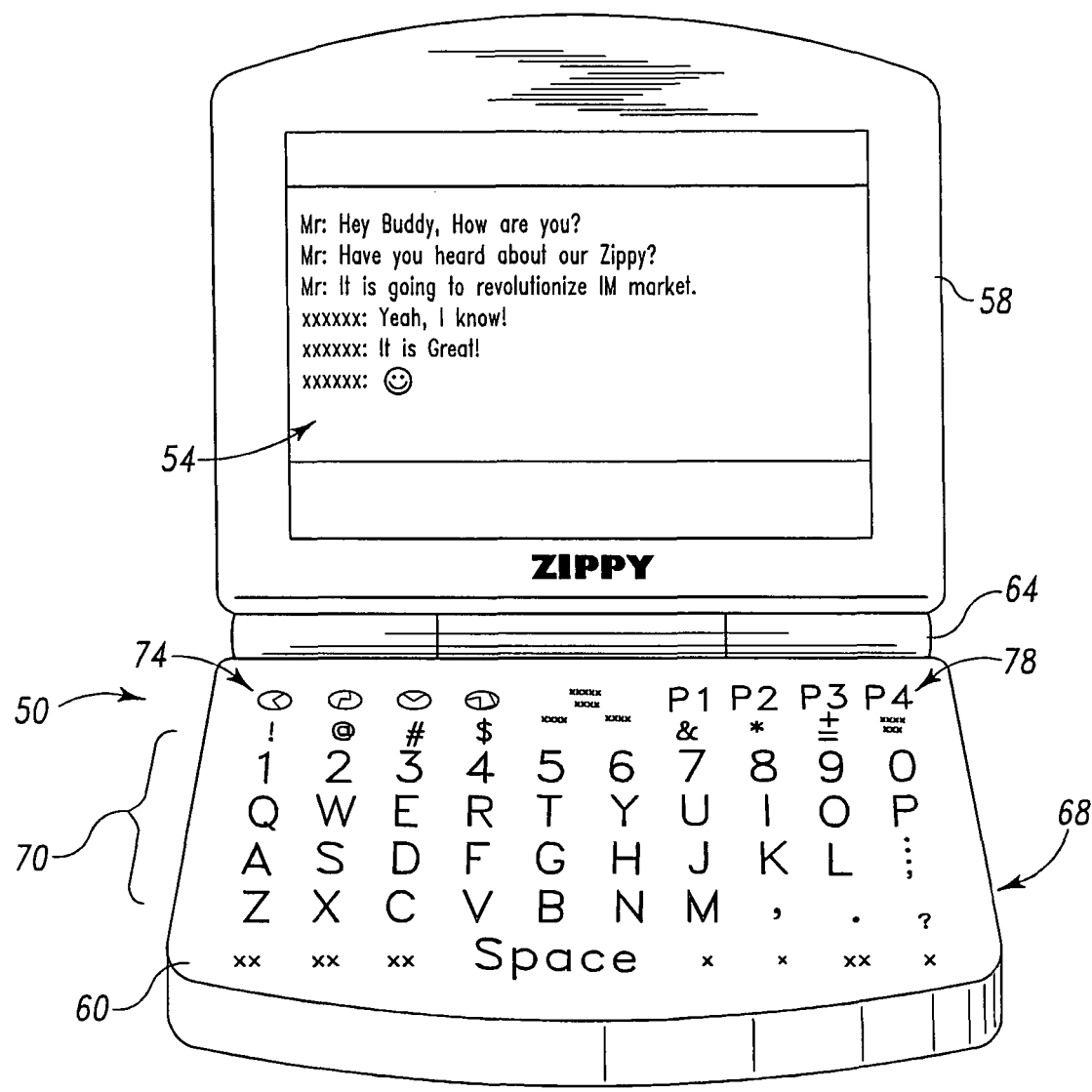
FIG. 2 shows an embodiment of an instant messaging terminal that operates in accordance with the principles of the present invention that is contained within a clamshell housing.

An implementation of an instant messaging terminal made in accordance with the principles of the present invention is shown in FIG. 2. The terminal 50 includes a display 54 on which conversation session windows are displayed. The content and organization of conversation session windows is described in more detail below. The display 54 is preferably an LCD display incorporated with a lid 58 of a clamshell configuration. Located with the bottom 60 of the clamshell configuration are the components that implement the control module, communications module, and other system elements for the terminal of the present invention. The lid 58 and bottom 60 of the clamshell configuration are pivotally joined to one another by a hinge 64. Located on the surface of the bottom 60 is a data entry device 68 that is comprised of a QWERTY keyboard section 70, pre-programmed emoticon keys 74, and programmable emoticon keys 78. Although terminal 50 is shown in a clamshell configuration, the terminal may be implemented in other terminal arrangements, such as a handheld terminal that integrates the display and keyboard in an arrangement that does not fold so the display is always exposed.

Figure 3:
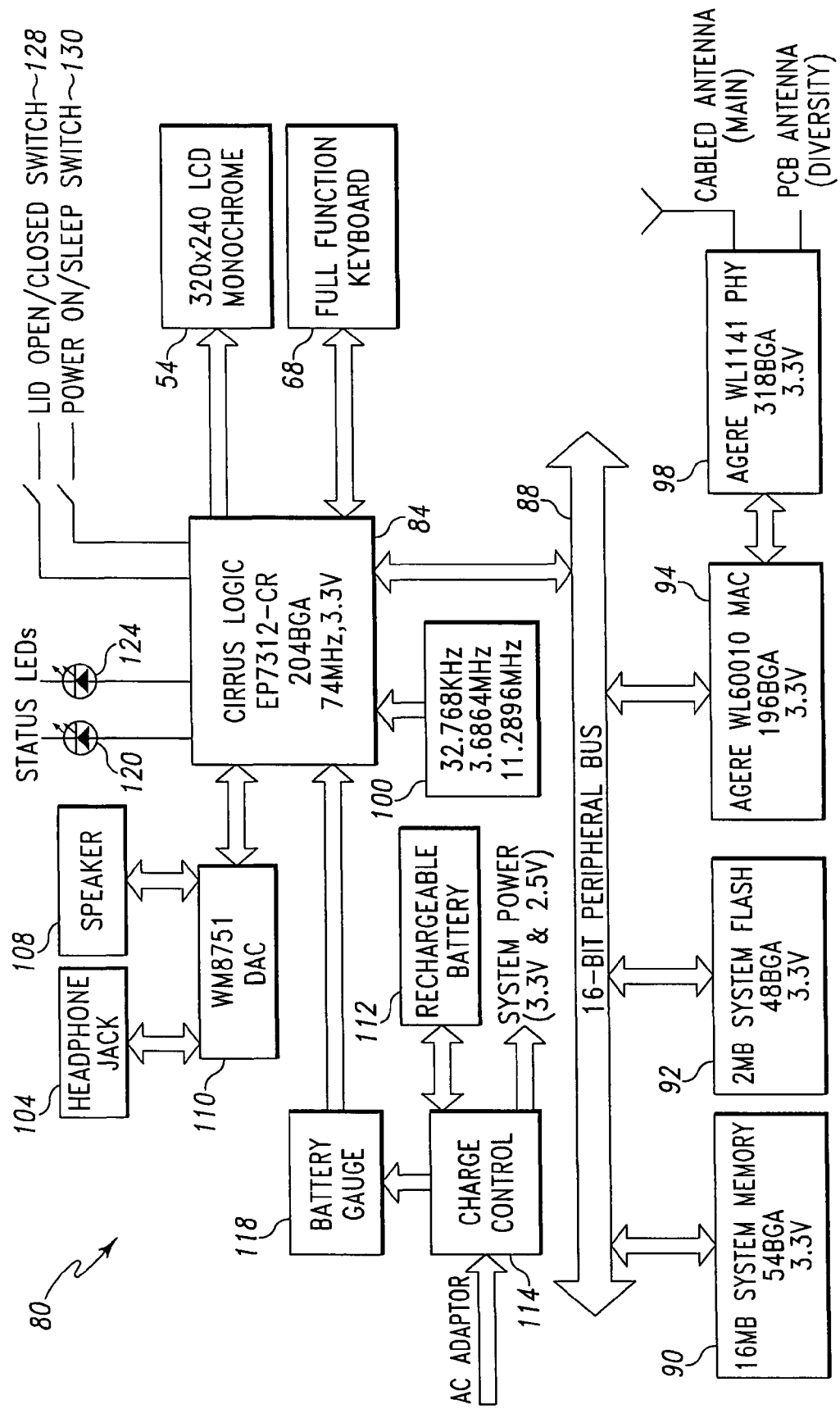
FIG. 3 is a block diagram of components comprising the instant messaging terminal shown in FIG. 2.

The components for implementing a terminal in accordance with the principles of the present invention are shown in FIG. 3. The system 80 includes a processor 84 that is coupled through a system bus 88 to memory components 90, 92, a media access controller 94, and a wireless transceiver 98. The processor 84 may be an ARM controller, such as a Cirrus Logic EP7312-CR operating at 74-90 MHz with an internal memory for the storage of the ARM embedded Linux version 2.4.19 or higher and the application program that implements the display, instant messaging and session protocols in accordance with the principles of the present invention. The Cirrus EP 7312-CR is available from Cirrus Logic, Inc. of Austin, Tex. However, other processors, ASICs, operating systems, and the like may be used to implement the present invention. The memory component 90 is a system memory used for managing the operation of the terminal and the memory component 92 may be used to update parameters and user settings for the operation of the terminal. The MAC 94 is used to manage the communication protocols with the access point 18 and the network components for communicating with the WAN 38. The MAC 94 may be implemented with an Agere WL60010 while the wireless transceiver 98 may be implemented with an Agere FW1141 PHY, both of which are available from Agere System, Allentown, Pa. The wireless transceiver 98 preferably implements one of the IEEE 802.11 standards, such as 802.11a, 802.11b, or 802.11g, although components supporting other short range communication standards for hot spots or other LANs may be used. The wireless transceiver 98 may radiate a signal through a cabled antenna that may be coupled to the housing of the terminal or through an antenna etched or otherwise provided on a printed circuit card.

Also coupled to the processor 84 are the display 54 and the keyboard 68. The display 54 is preferably a 320×240 LCD monochrome display, although other display types may be used as well. Clock circuitry 100 that is preferably capable of providing a 32.768 KHz, a 3.6864 MHz, and a 11.2896 MHz signal is coupled to the processor 84. A headphone jack 104 and a speaker 108 are coupled to the processor 84 through a digital/analog converter 110 so analog signals may be converted to audible sound for a user. A rechargeable battery 112 is coupled to DC power for recharging the battery that is generated by a standard AC adapter through a charge control circuit 114. The charge control circuit provides system power, preferably at the 3.3V and 2.5V levels, to the components of system 80. The system power levels are derived from the DC power received through the AC adapter or the rechargeable battery. The charge control circuit 114 also determines the voltage level of the battery for battery gauge 118 and this signal is also provided to the processor 84 for system management. The processor 84 also generates visible output signals through two status LEDs 120 and 124 as described in more detail below. Also, two processor inputs are coupled to a lid open/closed switch 128 and a power on/sleep switch 130 for purposes of power management.

Figure 4:
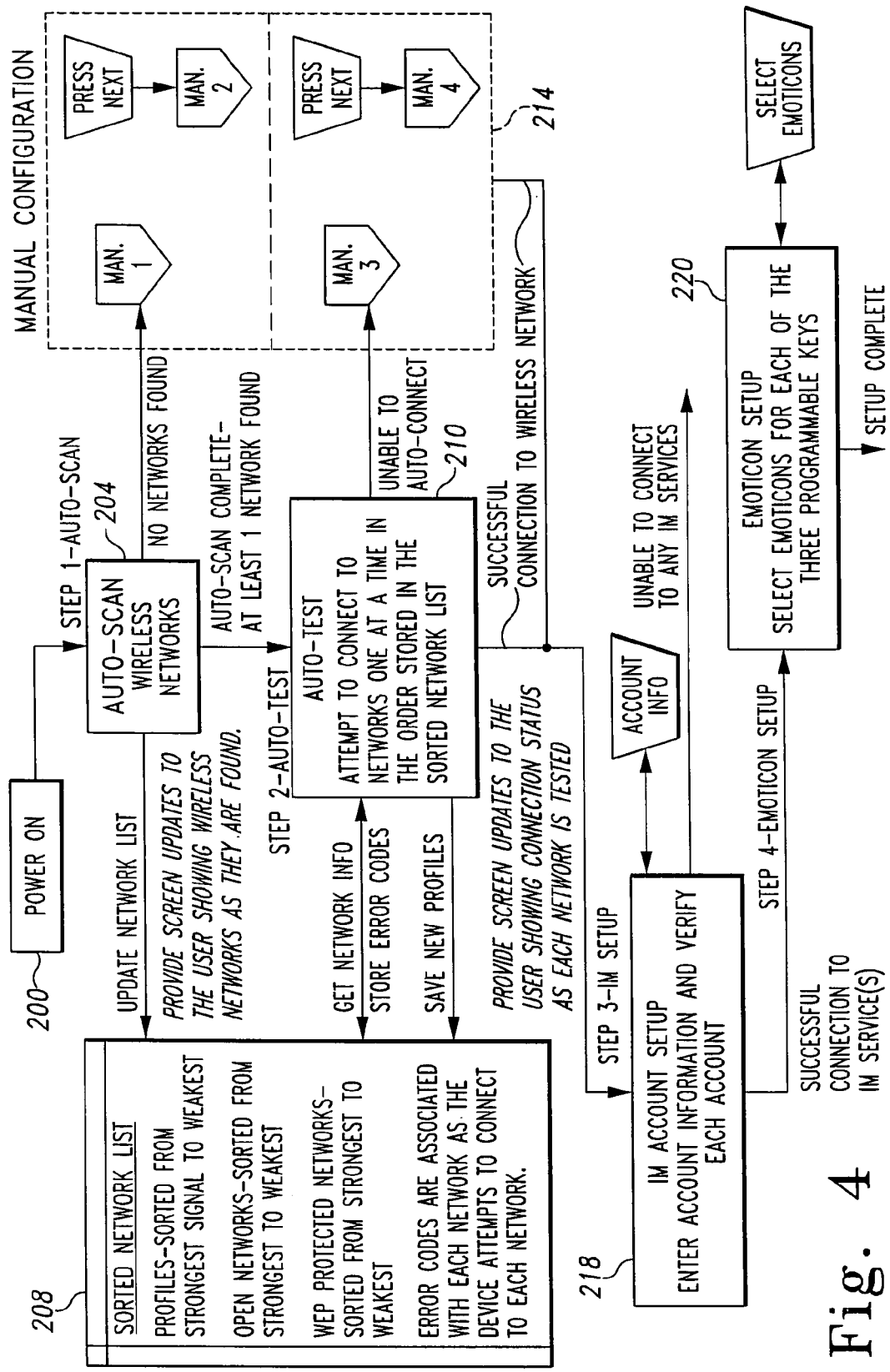
FIG. 4 is a flow diagram of an example of a process for automatically scanning for an available Wi-Fi network that may be performed by the terminal shown in FIG. 3.

One aspect of the present invention is an automatic search for Wi-Fi networks and storage of network profiles to facilitate network searching. The automatic scan for available Wi-Fi networks is shown in FIG. 4. After powering the terminal (block 200), the processor under the control of its operational program determines whether beacon messages are being received from one or more access points by the terminal and parses the content regarding the characteristics of the networks associated with an access point (block 204). Preferably, the network profiles are organized into two groups. The first group includes those networks that are open authentication networks and the second is comprised of those networks that implement a security scheme, such as WEP, for access to the network. Within each of these groups, the profiles are prioritized in a list from strongest signal to weakest signal (block 208). The contents of the network profiles are also updated by the automatic network testing function (block 210), as explained more fully below.

If no network beacon is received during the automatic network scanning (block 204), then manual options are presented to the user (block 214). The details of these manual options are presented more fully below. If a network is not found through the manual configuration procedure, the automatic testing function updates error codes for the network profiles partially constructed with the data received from the user (block 210). The terminal may then be moved another location where automatic scanning may be attempted.

After device authentication has occurred with one or more access points, a user may setup account information for his/her instant messaging accounts (block 218). These account data are stored and attempts are made to connect to the user's instant messaging accounts through an access point (block 218). After connections to IM message accounts are established, the user may select emoticons to correspond to the programmable keys 78 of keyboard 68 (block 220).

Figure 5:
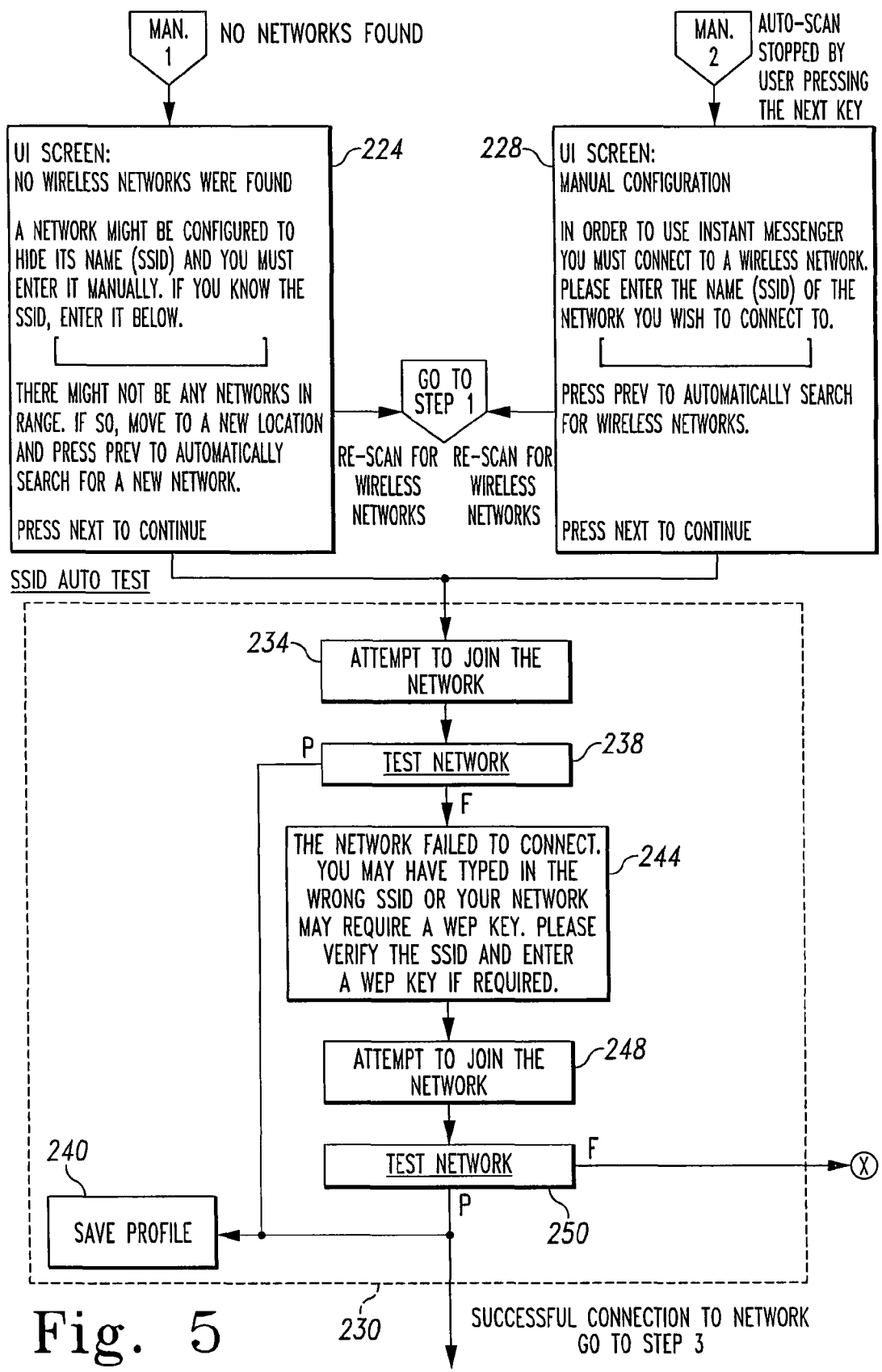
FIG. 5 is a flow diagram of an example of a process for testing for an available Wi-Fi network corresponding to a manually entered SSID.

If no network is detected during the automatic scanning procedure (block 204), then the terminal invokes the first manual terminal configuration option as shown in FIG. 5. A user interface screen is displayed that informs the user that no wireless network is found and the user is prompted for a network SSID, if one is known (block 224). If an SSID is not known, the user should move to a new location and reactivate the automatic network scanning by depressing the PREV key on keyboard 68, for example. Otherwise, after entering an SSID, the user may activate the automatic testing function with the known SSID by depressing the NEXT key, for example. If a user terminates the automatic network scanning before the search is completed by depressing the NEXT key, for example, during the automatic scanning, then a user interface screen is displayed that informs the user of the necessity for locating a network and prompts the user for a network SSID, if the user wants to search for a specific access point (block 228). The user is then given the option of either returning to the automatic scanning process, by depressing the PREV key, for example, or testing for the entered SSID, by depressing the NEXT key, for example.

If a network SSID was entered, either because no network was located or the user wanted to direct the scan for a particular network, then the terminal tests for the presence of the access point associated with the entered SSID (block 230). This function is part of the automatic testing procedure (block 210) shown in FIG. 4. The details of the SSID automatic testing function are shown in FIG. 5. The terminal generates and transmits a message for joining the network having the entered SSID (block 234) and tests to determine whether it has joined the corresponding network (block 238). If the network was joined, the network profile is stored (block 240) and the process proceeds with IM account setup (block 218, FIG. 4). Otherwise, the terminal displays a message indicating the connection attempt failed and requests that the user either check the SSID to determine whether it was entered incorrectly or to enter an authentication key, if one is required (block 244). Using the user's response to the message, another attempt is made to join the network by generating and transmitting an authentication message (block 248) and testing to determine whether a successful connection to the identified network has been made (block 250). If the connection attempt was successful, the network profile is updated (block 240) and the process continues with IM account setup (block 218, FIG. 4). If the attempt failed, the failure is identified as more fully set forth below in FIG. 7.

Figure 6:
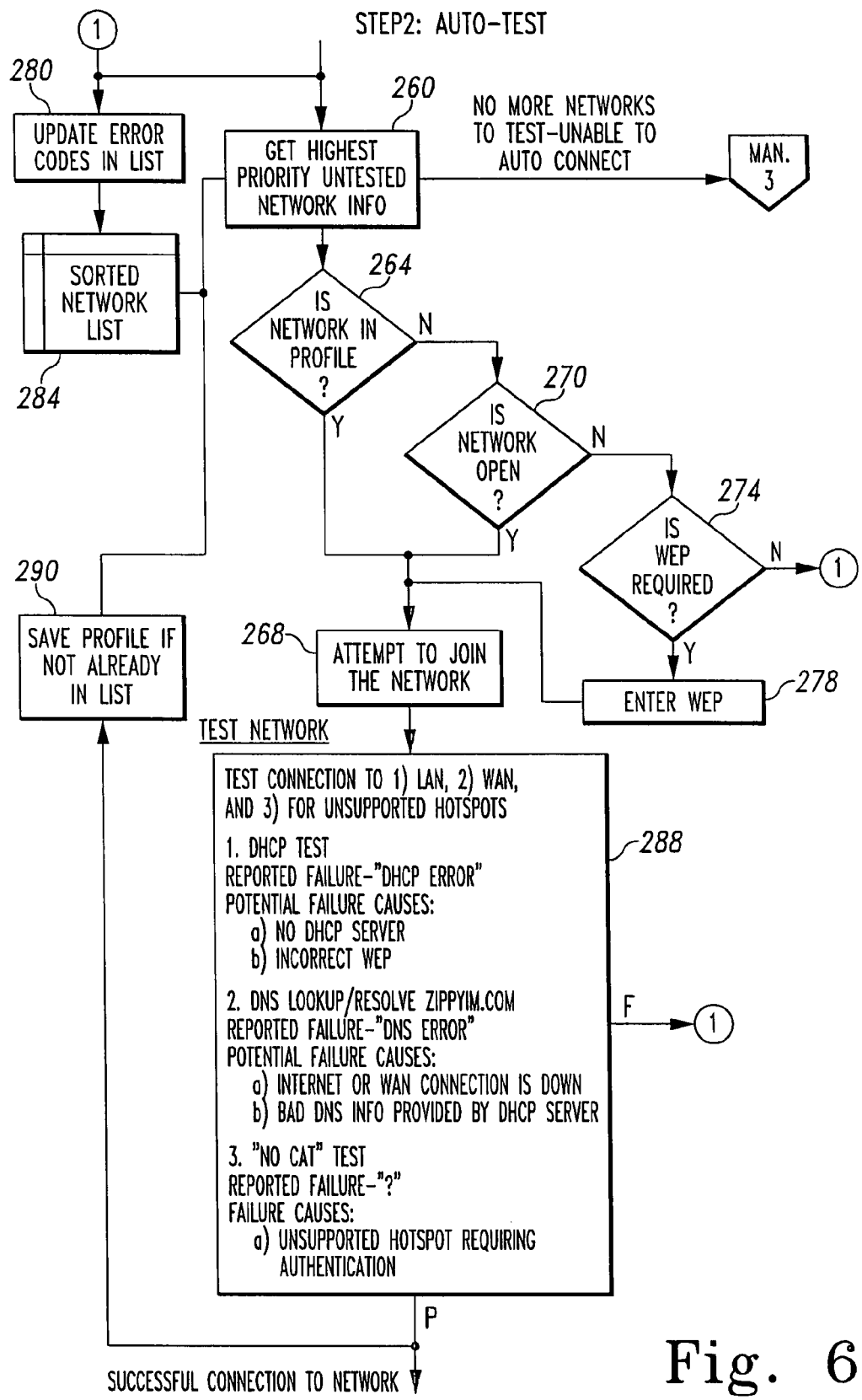
FIG. 6 is a flow diagram of an example of a process for automatically testing for a connection with an available Wi-Fi network that responded to the automatic scanning for available networks.

The remainder of the processing performed by the automatic testing procedure (block 210) is shown in FIG. 6. The list of networks identified and prioritized during the automatic scanning procedure (block 204, FIG. 4) is traversed, preferably, in the order of rank based on signal strength. The untested network response having the highest priority is selected (block 260). The process determines whether a profile already exists for the network identified in the response (block 264) and if one does, the authentication message corresponding to that network SSID is generated and transmitted (block 268). If no network profile already exists, the process determines whether the network is an open authentication network (block 270). If it is, then the process generates and transmits an authentication message with the corresponding SSID (block 268). If the network response is not an open network, then the process determines whether a security key is required (block 274). If one is required, then the user is prompted for the entry of the security key (block 278) and the requisite sequence of authentication messages is generated and transmitted in an attempt to join the corresponding network (block 268). If the network type is not recognized, then the error codes associated with the network response data being processed are updated (block 280) and stored in the prioritized network response list (block 284). The process then continues with the next network response (block 260) and, if there are no more responses to process, the user is provided with a third manual configuration option, described more fully below.

The network testing function includes testing the connection to the LAN through the access point, the WAN coupled to the LAN through the backhaul of the access point, and for unsupported hotspots. Specifically, the network test function determines the DHCP server failed to assign a valid IP address to the terminal, whether the DHCP server failed to provide a valid DNS server address to the terminal, or the type of network encountered cannot be identified (block 288). The DHCP server failure may be related to the DHCP server being down, the authentication sequence not meeting the criteria for network authentication, incorrect DNS server data being supplied by the DHCP server, or the connection to the WAN being down, among other possibilities. Any failures to connect to a network are used to update the error codes (block 280) that are stored in the prioritized list (block 284) before the process moves to the next network response in the list (block 260). If a connection is made to a network, the network data, including SSID and security key, if required, are stored in a profile for the network (block 290). Any successful connection results in the process prompting the user for IM account data (block 218, FIG. 4).

Figure 7A:
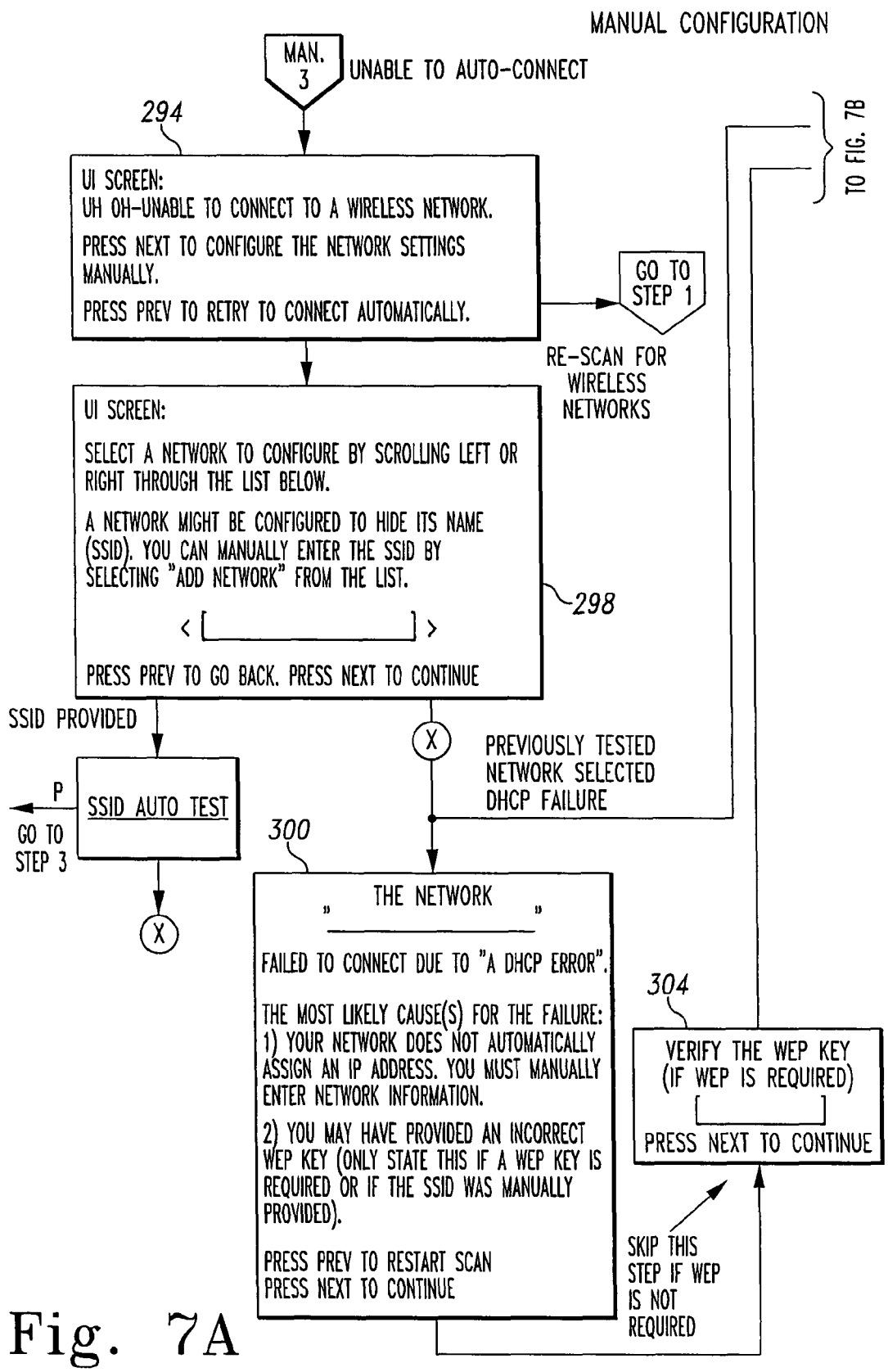
FIG. 7 is a flow diagram of an example of a process for manually entering the network settings for testing for a connection to a Wi-Fi network.
Figure 7B:
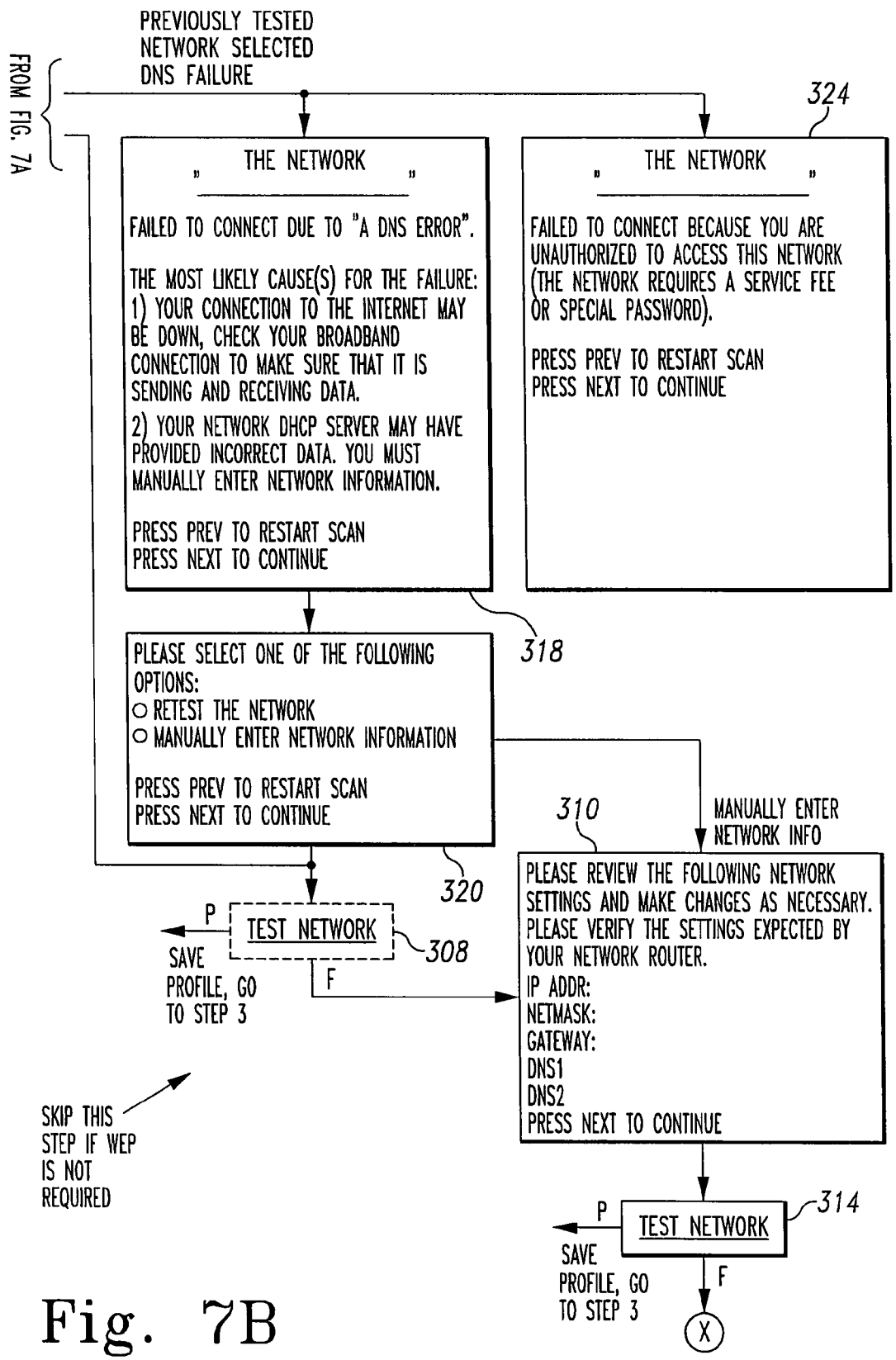
Figure 8:
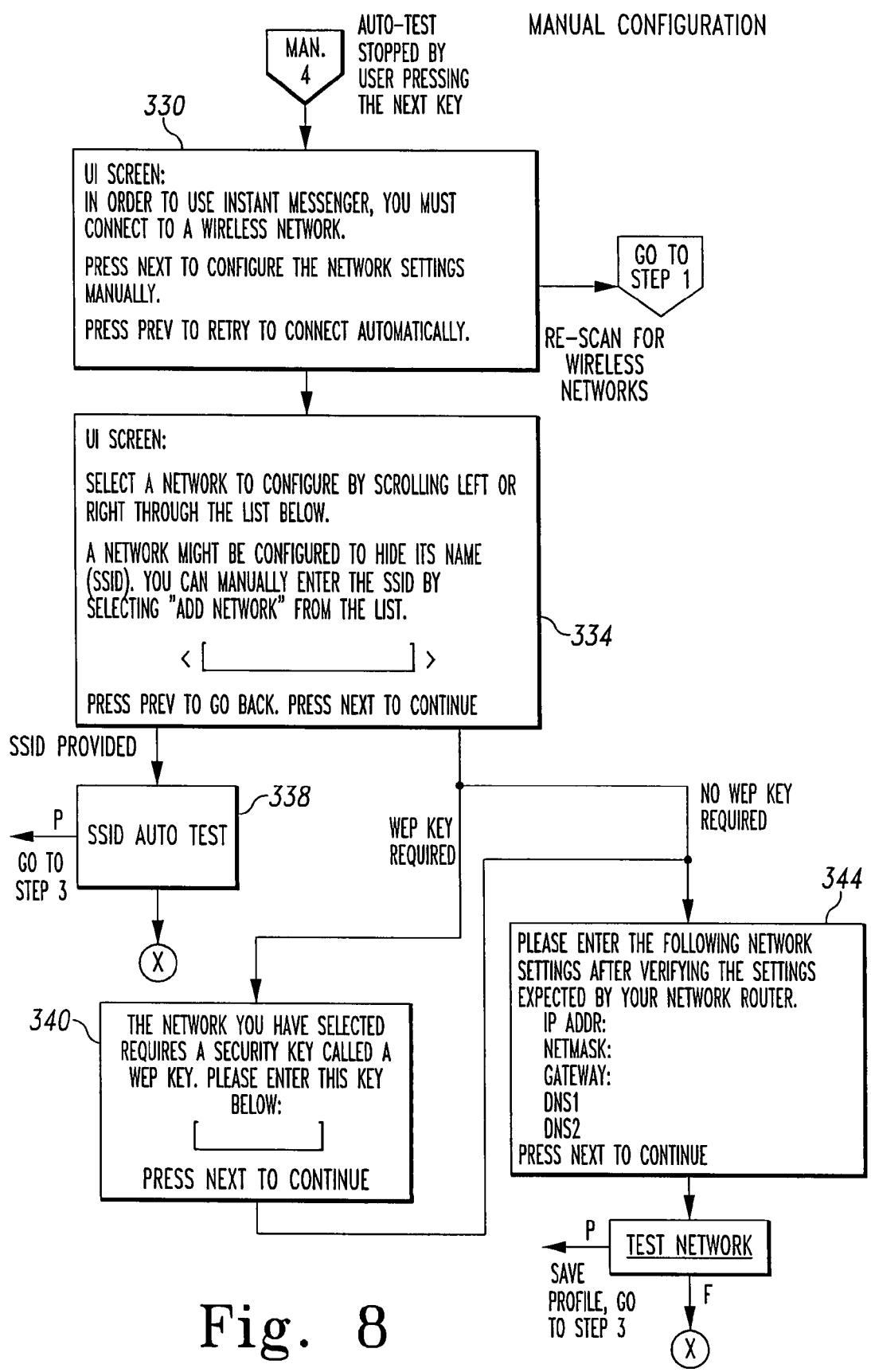
FIG. 8 is a flow diagram of an example of a process for enabling a user to manually enter network settings for testing for a connection to a Wi-Fi network instead of allowing the termina shown in FIG. 3 to automatically test for a network connection.

If the automatic testing procedure is unable to connect to any network, then the user is prompted for a manual configuration attempt as shown in FIG. 7. The user is informed that the terminal was unable to connect to one of the detected wireless networks. The user is then given the opportunity to either attempt a manual configuration or re-initiate the automatic scanning process by depressing the NEXT or PREV key, respectively, for example (block 294). If the user selects manual configuration, then the network response list is displayed so the user can select one of the responses and provide additional data, such as the SSID, one or more IP addresses for the network router, gateway, or domain name servers, and a network mask (block 298). If data are entered and the user continues the process, the automatic SSID testing function (block 230, FIG. 5) is performed. If a wireless network connection is made, then the user may setup his/her IM accounts (block 218, FIG. 4). Otherwise, the errors from the automatic SSID testing function are analyzed. Also, if the user did not enter network data and indicated the process should continue, the detected errors are analyzed. The user may also be given the option of returning to the previous screen and activating the automatic scanning procedure after the terminal is moved.

The analysis of the network errors is also shown in FIG. 7. If the network error is determined to be a DHCP server error, then the user is informed that he or she may be required to enter an IP address for the terminal and/or other network components because the DHCP server does not automatically do it. The user is also informed that data previously entered may be incorrect and that it should be verified (block 300). If the terminal has determined that a pre-shared authentication key is required, the user is prompted for one (block 304). Once data are entered and then either verified or corrected, the terminal attempts to connect to the corresponding network (block 308). If the attempt is successful, the network data are stored in a profile. Otherwise, the network data are displayed for verification (block 310) before another attempt is made to connect to the network (block 314). This process repeats until the user either enters the correct data for connecting to the network, moves to a location where the network corresponding to the entered data can be joined, or powers down.

The terminal may also determine that the network error is a DNS server failure. If so, the user is informed of the DNS error and that it may be the result of an inoperative communication link with the WAN or incorrect DNS server data being received from the DHCP server (block 318). The user may be given the option of retesting the network with the previously used network parameters or of manually entering the network parameters such as IP addresses for one or more network components and the network mask (block 320). The network data may be displayed for verification (block 310) before another attempt is made to connect to the network (block 314). This process repeats until the user either enters the correct data for connecting to the network, moves to a location where the network corresponding to the entered data can be joined, or powers down.

One other error that may be detected is a network authorization error. If this error is detected, the user is informed that authorization to join the network has not been granted and that the user should move and restart the automatic scanning procedure or select another network for a connection attempt (block 324). Depressing the PREV key, for example, may then recommence the automatic scanning procedure or depressing the NEXT key, for example, may result in the display of the network response and profile list so the user may select another network for connection attempts (block 298).

Rather than allowing the terminal to automatically test for a network connection, a user may terminate the automatic testing procedure and manually enter the data for the network connection. If the user terminates the automatic testing procedure, then a screen may be displayed that inform the user that a network connection is required (block 330). The user may be given the opportunity to restart the automatic testing procedure, in the event that the user inadvertently stopped the testing procedure without knowing the terminal was attempting to join a network. The user may also be given the opportunity to manually enter the network parameters required for attempting a network connection. To facilitate the manual entry of network parameters, the network list may be displayed so the user may select a network for which the user is entering network parameters (block 334). If the user provides an SSID for a network that did not broadcast one, the SSID automatic test is conducted (block 338) and if a connection is made, the network data are stored in a profile and the process continues with IM account setup. Otherwise, the resulting network error is analyzed (see FIG. 7). If the user selects a network for which the SSID is known, then the user is prompted to provide an authentication key, if required, (block 340), and the remaining network settings expected by the network router (block 344). With the entered data, the process generates and transmits an authentication sequence and tests to join the corresponding network (block 348). If the attempt fails, the resulting error is analyzed (see FIG. 7). Otherwise, the network data are stored in a profile and the process continues with IM account setup.

Figure 9:
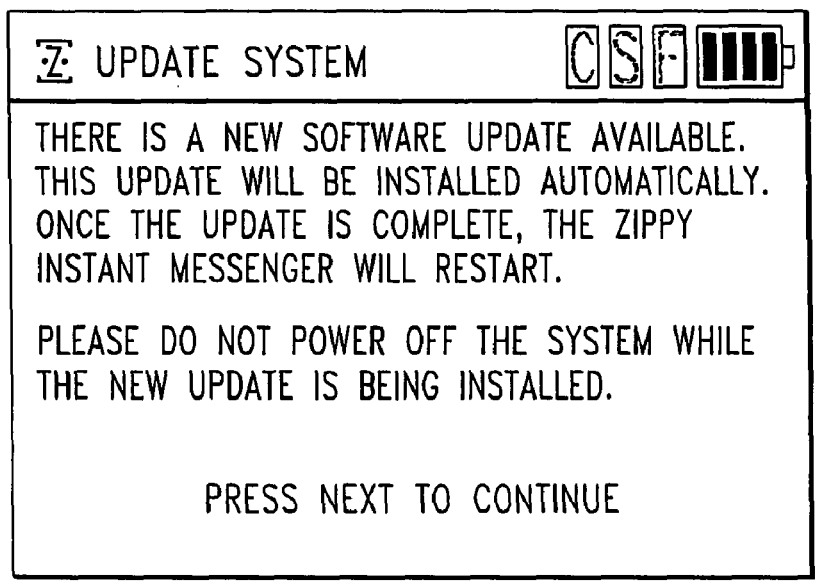
FIG. 9 depicts a user interface screen for informing a user that a software update is available for the terminal shown in FIG. 3.
Figure 10:
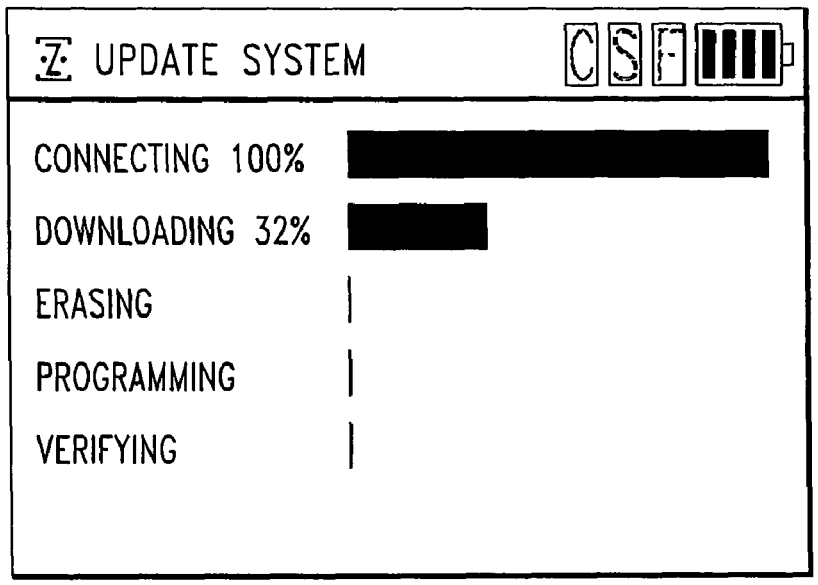
FIG. 10 depicts a user interface screen for providing a user with a status of a software update installation in the terminal shown in FIG. 3.
Figure 11A:
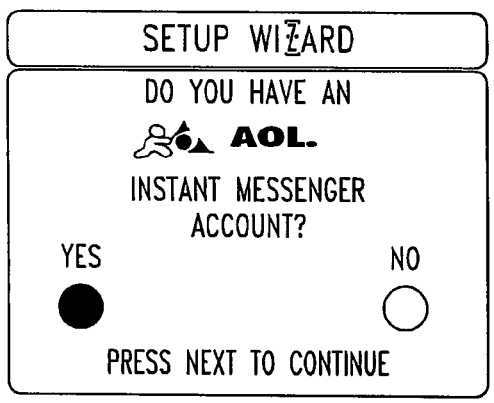
FIGS. 11a through 11f depict user interface screens for obtaining instant messaging account data.
Figure 11D:
Figure 11B:
Figure 11E:
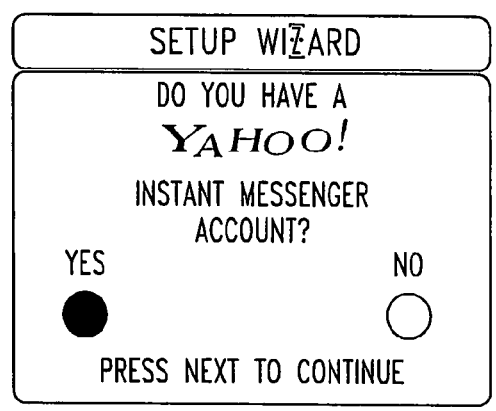
Figure 11C:
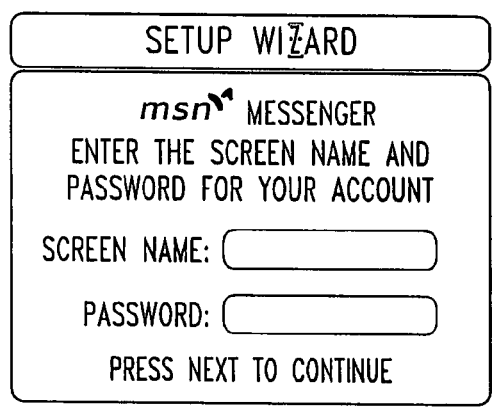
Figure 11F:
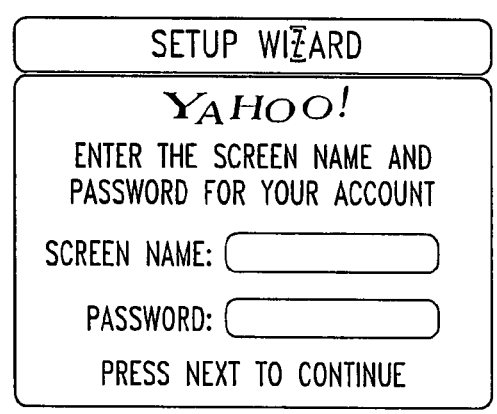

Prior to prompting the user for IM account data, the terminal, preferably, connects to the terminal manufacturer's web site and determines whether a software update is available. If one is available for downloading, the user may be informed through a user interface screen, such as the one shown in FIG. 9. The terminal may determine not to display the screen shown in FIG. 9, if the process determines that the terminal is being operated on battery power alone and there is insufficient battery capacity to ensure that the download and installation will be successfully completed. If the download screen is displayed and the user accepts the downloading and installation of the software update, a screen, such as the one shown in FIG. 10, may be displayed and periodically updated to inform the user of the progress of the update installation.

Implementation of the user IM account setup (block 218, FIG. 4) may include a sequence of user interface screens, such as those shown in FIGS. 11a-11f. This sequence provides a user for information regarding the existence of IM accounts with each of the major IM service providers. If the user responds by indicating that the user has an instant service account with an IM service provider, the user is prompted for entry of the user's screen name and password. Preferably, the passwords are not literally displayed but an invalid password character, such as a "*", is displayed for each character of the password. The account data is stored for each account, again with the password data preferably stored in an encrypted manner.

Figure 12A:
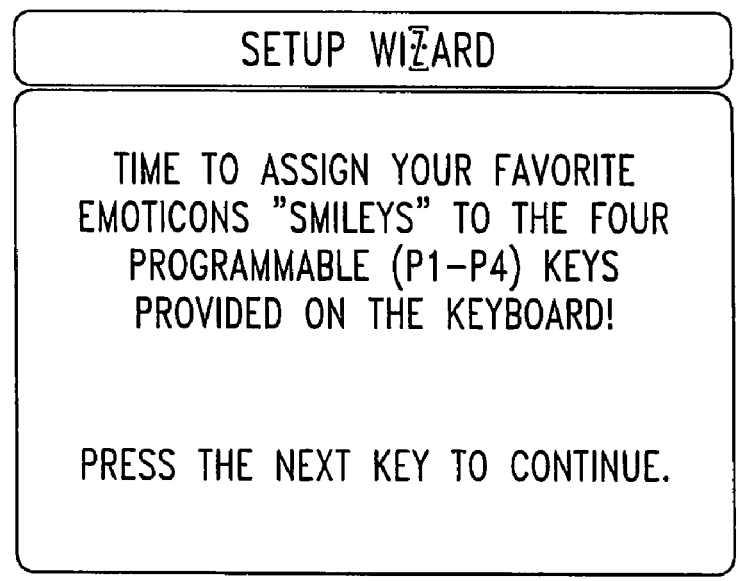
FIGS. 12a and 12b depict user interface screens that may be used to associate emoticons with programmable keys.
Figure 12B:
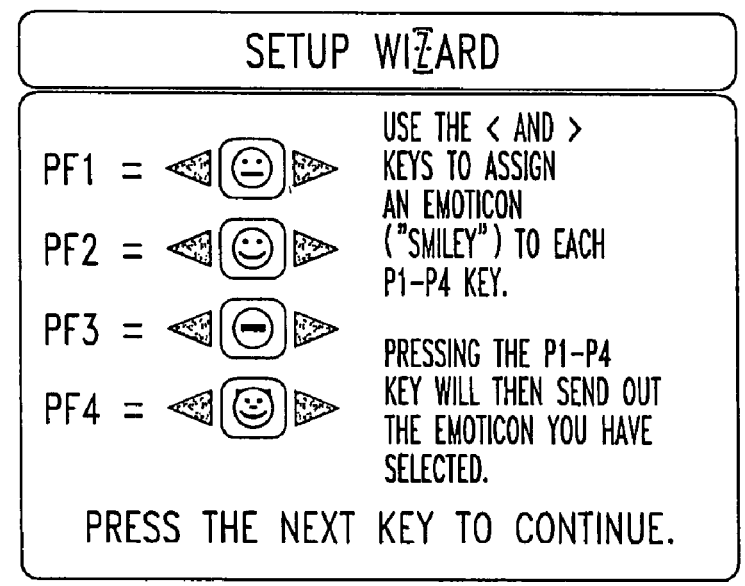

The emoticon selection procedure (block 220, FIG. 4) may be performed using the screens depicted in FIGS. 12a and 12b. The first screen (FIG. 12a) identifies the keys of the keyboard 68 that will be associated with the selected emoticons. The second screen directs the user to depress the "<" and ">" keys to change the graphical symbol that is displayed and depression of a programmable key associates the key and the displayed symbol. After the user has assigned graphical symbols to one or more of the keys, the user may depress the NEXT key to begin use of the instant messaging terminal.

Figure 13:
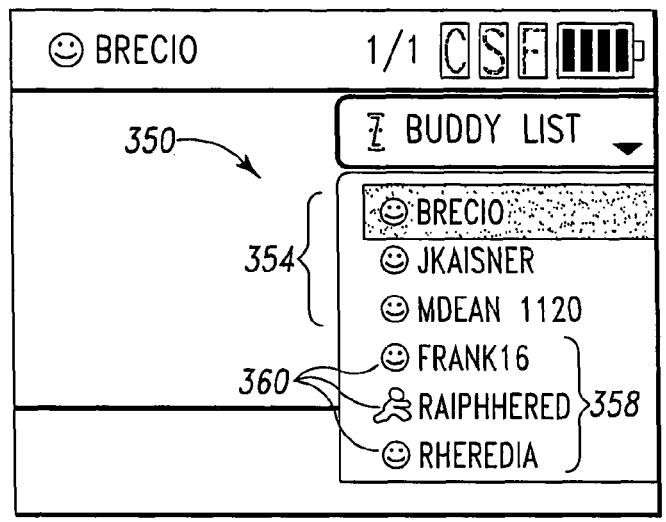
FIG. 13 depicts the display of a buddy list on the terminal of FIG. 3.

To commence operation of the terminal for conversations through an instant messaging service, a user may first depress the buddy list key on the keyboard 68. In response, a buddy list window is opened. If a conversation session window was being displayed before the buddy list window was depressed, the buddy list is displayed on top of the conversation window as shown in FIG. 13. Otherwise, the buddy list is displayed by itself. The buddy list 350 shown in FIG. 13 is generated from data obtained from each instant messaging service to which the terminal is coupled through the access point 18. Upon login with a service, the service provides the terminal with a list of the subscriber's buddies that are also logged onto the service. The terminal of the present invention integrates the buddies into a single list. The list is preferably divided into two parts. The list begins with an active list 354 of those buddies with whom the terminal has established an active conversation. These buddies are displayed in bold type as shown in the figure, except for the first one, which is highlighted by the cursor. An available list 358 is displayed following the active list 354 to identify those buddies currently logged into a messaging service but not presently engaged in an active conversation. Displayed adjacent to the buddy names are service identifiers 360 that indicate the service to which a buddy is coupled. In the example shown in FIG. 13, the service identifiers are replicas of service icons. Preferably, the buddy names are alphabetized within each portion of the buddy list. This facilitates location of a buddy, if available, on the list. The buddy list may be navigated with cursor keys or by typing alphanumeric characters when the buddy list is actively displayed. The typing highlights an entry in the buddy list that corresponds to the typed characters. To initiate a conversation with a buddy, the user may highlight a buddy name and press the <enter> key to cause a conversation session window to be generated for that buddy. An opening message may be typed into the window and then sent by depressing the <enter> key.

Figure 14A:
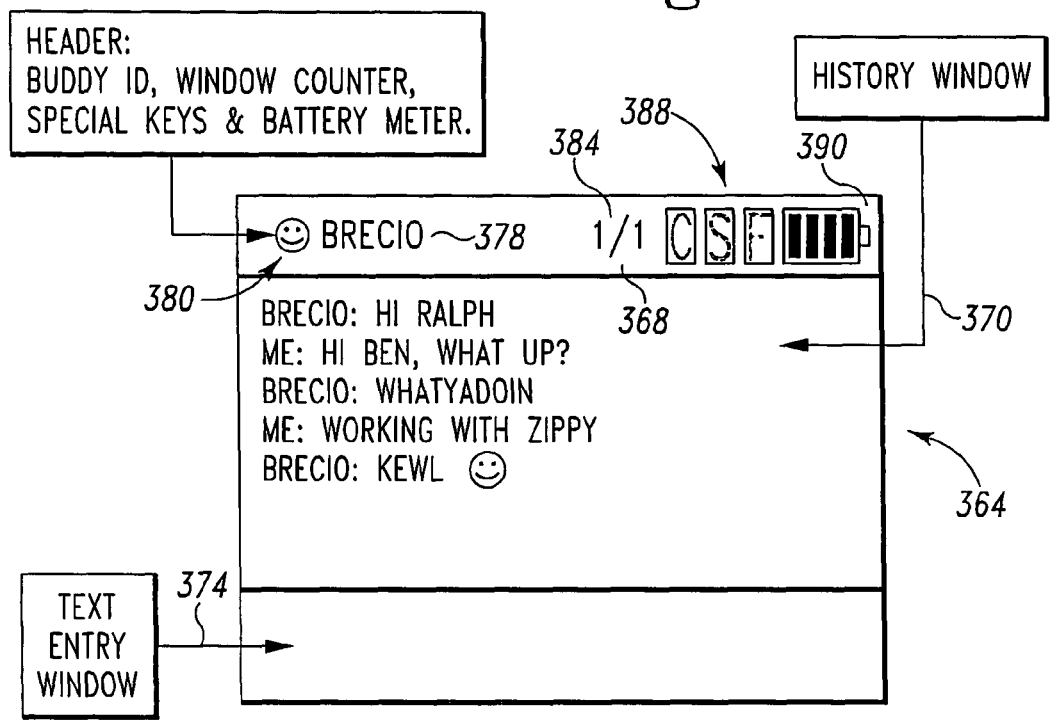
FIGS. 14a and 14b depict a conversation session window for an active conversation being conducted with a buddy.

A conversation session window that may be displayed on a terminal made in accordance with the principles of the present invention is shown in FIG. 14a. The conversation session window 364 includes a header 368, a history window 370, and a text entry window 374. The header includes a buddy name 378, a service identifier 380, a conversation rank 384, active special key indicators 388, and a battery gauge 390. The buddy name 378 corresponds to one of the buddy identifiers in the buddy list so the conversation window may be accessed through the buddy list. The service identifier 380 informs the user of the service through which the identified buddy is coupled to the user's terminal. The conversation rank 384 identifies a rank number for the conversation and the total number of active conversations. As conversations are added, a rank number that is one greater than the greatest existing number is assigned to the added window and the total number of conversations is increased by one as well. When a conversation is terminated, the total number of windows in all of the displayed ranks is decreased by one and the rank for the windows following the terminated conversation is decreased by one. Thus, the conversation rank 384 identifies the total number of conversations and the order of the displayed window within that number of conversations. A user may navigate through the conversation windows in numerical order by using the PREV and NEXT keys. The special key indicators 388 indicate whether the control, shift, or function key is active for the text entry window 374. Battery gauge 390 provides a user with an indication of the battery strength so the user may connect the terminal to an AC adapter for supplying power to the terminal and for recharging the battery.

Figure 14B:
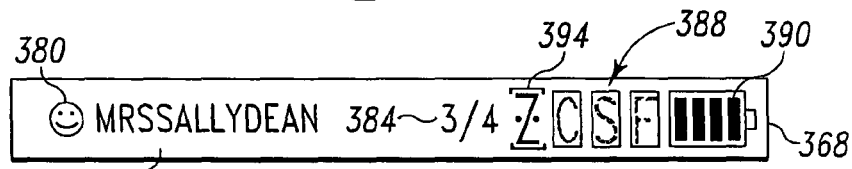

Another aspect of the header 370 is shown in FIG. 14b. The header 370 in that figure includes an animated composite character 394 as well as the service identifier 380, the buddy identifier 378, the conversation rank 384, the special key indicators 388 and the battery gauge 390. The animated composite character 394 is inserted in the header in response to receipt of a message from a buddy other than the one displayed in the current window. To determine which buddy sent the message, the user depresses the buddy list key to display the buddy list over the current conversation window. The animated composite character 394 is displayed next to each buddy in the list for which there is an outstanding message. By highlighting the buddy and pressing the <enter> key, the conversation window corresponding to that buddy is displayed so the user may view the newly received message. The presence of the animated composite character 394 continues in the header for the currently displayed window until all received messages have been reviewed.

Either additionally or alternatively, a new message indicator may be provided by displaying a textual message in the history window 370 that announces the receipt of a new message and the identity of the sender. Preferably, this message only persists for a short period of time, for example, three seconds, and then disappears. The display of the announcement may also be accompanied by an audible signal to attract attention to the announcement of the new message. Preferably, while the announcement is being displayed, the depression of the CNTL-NEXT keys in sequence causes the terminal to display the conversation window for the session with the sender of the new message that resulted in the announcement display. Depressing the CNTL-PREV keys in sequence may be used to return the user to the conversation window that was interrupted by the announcement message.

The history window 370 contains the most recent lines of the conversation with the buddy identified in the header 368. Each line of the conversation begins with a name indicating whether the line was generated and sent by the user or by the buddy. The text entry window 374 displays the characters typed by a user to form a message to be sent to a buddy. Textual characters are entered by typing on the keys in the QWERTY portion 70 of the keyboard 68 while graphical symbols may be entered by depressing the emoticon keys 74 or the programmable keys 78. Preferably, the pre-programmed emoticon keys are assigned to the smiley face, sad face, and surprised face graphical characters, although other graphical characters may be assigned to these keys. While the terminal discussed as an example has three pre-programmed keys for emoticons, other numbers of pre-programmed emoticon keys may be used. After a user has entered and edited a message, the message may be sent to the messaging service for delivery to the buddy by depressing the <send> key.

As shown above in FIG. 3, the processor 84 is coupled to a lid close/open switch 128. In response to detection of the lid switch being closed, the processor 84 puts the terminal in a standby power mode. In this mode, the display and other significant power consuming devices are turned off, although a network connection is maintained, if active before the lid is closed. If a new message is received from a buddy while the terminal is in the standby mode, the processor 84 begins to blink one of the status LEDs 120, 124 to indicate a newly received message to the user. Opening the terminal causes full power to be applied to the terminal components and a conversation window is displayed that contains the new message in the history window. The user may now view the message and operate the terminal as discussed above as the past conversations are maintained during the standby mode and may be displayed. If the network connection is lost during the standby mode, the wireless chip set is turned off. However, the conversation histories are maintained and displayed when the terminal is reopened. Once all new messages in the windows have been read, an automatic scan for networks is commenced.

The terminal of the present invention supports two sets of emoticons. The first set of emoticons may be associated with the pre-programmed keys 74 or the programmable emoticon keys 78 on the keyboard 68. These emoticons are more universally used in character sets for keyboards. For these emoticons, the terminal automatically generates the key sequence that generates the corresponding emoticon within the service through which a buddy is coupled to the terminal. For example, generation of a ☺ on the AOL IM service, a Control-1 or ":-)" key sequence is sent, while a ":)" key sequence sends the same smiley emoticon in the Yahoo IM service. The emoticons that may be implemented by the terminal of the present invention across representative IM services are shown in Table 1.

TABLE 1

| Smiley | Meaning | AOL Key Codes Supported/Required to generate Smiley (w/o the quotes). | MSN Key Codes Supported/Required to generate Smiley | Yahoo Key Codes Supported/Required to generate Smiley |
|---|---|---|---|---|
| ☺ | Smiling | Ctrl + 1 or ":)"or ":-)" | :) | :) or :-) |
| ☹ | Frowning | Ctrl + 2 or ":(" or ":-(" | :( | :( or :-( |
| 😉 | Winking | Ctrl + 3 or ";)"or ";-)" | ;) | ;) or ;-) |
| 😛 | Sticking-out-tongue | Ctrl + 4 or ":-P" | :P | :P or :-P |
| 😮 | Surprised | Ctrl + 5 | :O | :o or :-o |
| 😘 | Kissing | Ctrl + 6 or ":-*" | (K) | :* or :-* |
| 😎 | Cool | Ctrl + 8 | (H) | B-) |
| 😳 | Embarrassed | Ctrl + Shift + 3 | :$ | :"> |
| 😇 | Innocent | Ctrl + Shift + 4 | (A) | O:-) |

TABLE 1-continued

| Smiley | Meaning | AOL Key Codes Supported/Required to generate Smiley (w/o the quotes). | MSN Key Codes Supported/Required to generate Smiley | Yahoo Key Codes Supported/Required to generate Smiley |
|---|---|---|---|---|
| | Crying | Ctrl + Shift + 6 | :'( | :(( or :-(( |
| | Laughing or Cheese | Ctrl + Shift + 8 | :D | :D or :-D |

The second set of emoticons is specific to one or more messaging services and are not necessarily broadly known. Most of these emoticons cannot be assigned to the programmable keys but can be entered by depressing the standard key sequence recognized by the particular service. Any emoticon that a user attempts to type in the text entry window 374 that is not supported by the service through which a buddy is coupled to the terminal is not generated in the window. In this manner, the user is reminded that the emoticon that the user is attempting to type is not supported by that service. The known emoticons supported by the major known services that may be generated by a terminal made in accordance with the principles of the present invention are shown in the following tables 2-4.

TABLE 2

| | 1. Yahoo Emoticons: | |
|---|---|---|
| | :) | happy |
| | :( | sad |
| | ;) | wink |
| | :D | big grin |
| | ;;) | batting eyelashes |
| | :-/ | confused |
| | :x | love struck |
| | :"> | blushing |
| | :p | tongue |
| | * | kiss |
| | :O | shock |
| | X-( | angry |
| | :> | smug |
| | B-) | cool |
| | :-s | worried |
| | >:) | devilish |
| | :(( | crying |
| | :)) | laughing |
| | :\| | straight face |
| | /:) | raised eyebrow |
| | O:) | angel |
| | :-B | nerd |
| | =; | talk to the hand |
| | I-) | sleep |
| | 8-\| | rolling eyes |
| | :-& | sick |
| | :-$ | shhh |
| | [-( | not talking |
| | :o) | clown |
| | 8-} | silly |
| | (:\| | tired |
| | =P~ | drooling |
| | :-? | thinking |

TABLE 2-continued

| | 1. Yahoo Emoticons: | |
|---|---|---|
| | #-o | d'oh! |
| | =D> | applause |

TABLE 3

| | MSN Emoticons |
|---|---|
| | (Y) or (y) |
| | (N) or (n) |
| | (B) or (b) |
| | (D) or (d) |
| | (X) or (x) |
| | (Z) or (z) |
| | (6) |
| | :-[ or :[ |
| | (}) |
| | ({) |
| | :-) or :) |
| | :-D or :d |
| | :-O or :o |
| | :-P or :p |
| | ;-) or ;) |
| | :-( or :( |
| | :-S or :s |
| | :-\| or :\| |
| | :'( |
| | :$ or :-$ |
| | (H) or (h) |
| | :-@ or :@ |
| | (A) or (a) |
| | (L) or (l) |
| | (U) or (u) |
| | (K) or (k) |
| | (G) or (g) |
| | (F) or (f) |
| | (W) or (w) |
| | (P) or (p) |
| | (~) |
| | (T) or (t) |
| | (@) |
| | (&) |
| | (C) or (c) |
| | (I) or (i) |
| | (S) |
| | (*) |
| | (8) |
| | (E) or (e) |
| | () |

TABLE 3-continued

MSN Emoticons

| | | |
|---|---|---|
| ☺ | (O) or (o) | |
| ☺ | (M) or (m) | |

TABLE 4

2. AOL Emoticons

| | | |
|---|---|---|
| ☺ | Smiling | Ctrl + 1 |
| ☺ | Frowning | Ctrl + 2 |
| ☺ | Winking | Ctrl + 3 |
| ☺ | Sticking-out-tongue | Ctrl + 4 |
| ☺ | Surprised | Ctrl + 5 |
| ☺ | Kissing | Ctrl + 6 |
| ☺ | Yelling | Ctrl + 7 |
| ☺ | Cool | Ctrl + 8 |
| ☺ | Money-mouth | Ctrl + Shift + 1 |
| ☺ | Foot-in-mouth | Ctrl + Shift + 2 |
| ☺ | Embarrassed | Ctrl + Shift + 3 |
| ☺ | Innocent | Ctrl + Shift + 4 |
| ☺ | Undecided | Ctrl + Shift + 5 |
| ☺ | Crying | Ctrl + Shift + 6 |
| ☺ | Lips-are-sealed | Ctrl + Shift + 7 |
| ☺ | Laughing | Ctrl + Shift + 8 |

As already noted, an instant messaging terminal made in accordance with the present invention includes an audio player application. The application player may be implemented with a program stored in memory for the processor. The program may also be later added to the terminal through a plug-in installation procedure, as is well known. A user may invoke this application program from a displayed menu to download music files from Internet sites or from music files stored on a user's PC or other music storage device. The files received from the Internet may be downloaded through the access point when the terminal is coupled to the Internet through a Wi-Fi access point. Downloads from a user's PC or other storage device may be enabled by coupling the external device to the external peripheral bus of the terminal and invoking the audio player application program. Also, the audio player application program may play audio files streamed or downloaded from Internet radio sites. Stored, streamed, or downloaded files may be decoded by the application program and converted by the D/A converter in the instant messaging terminal into analog electrical signals for driving the speakers or headphone, if connected, of the messaging terminal. The audio player application may be invoked so it executes while the instant messaging application is also active. The operating system executed by the processor of the terminal multi-tasks the applications so that the user is able to listen to stored and/or downloaded music files while exchanging instant messages with buddies.

Figure 15:
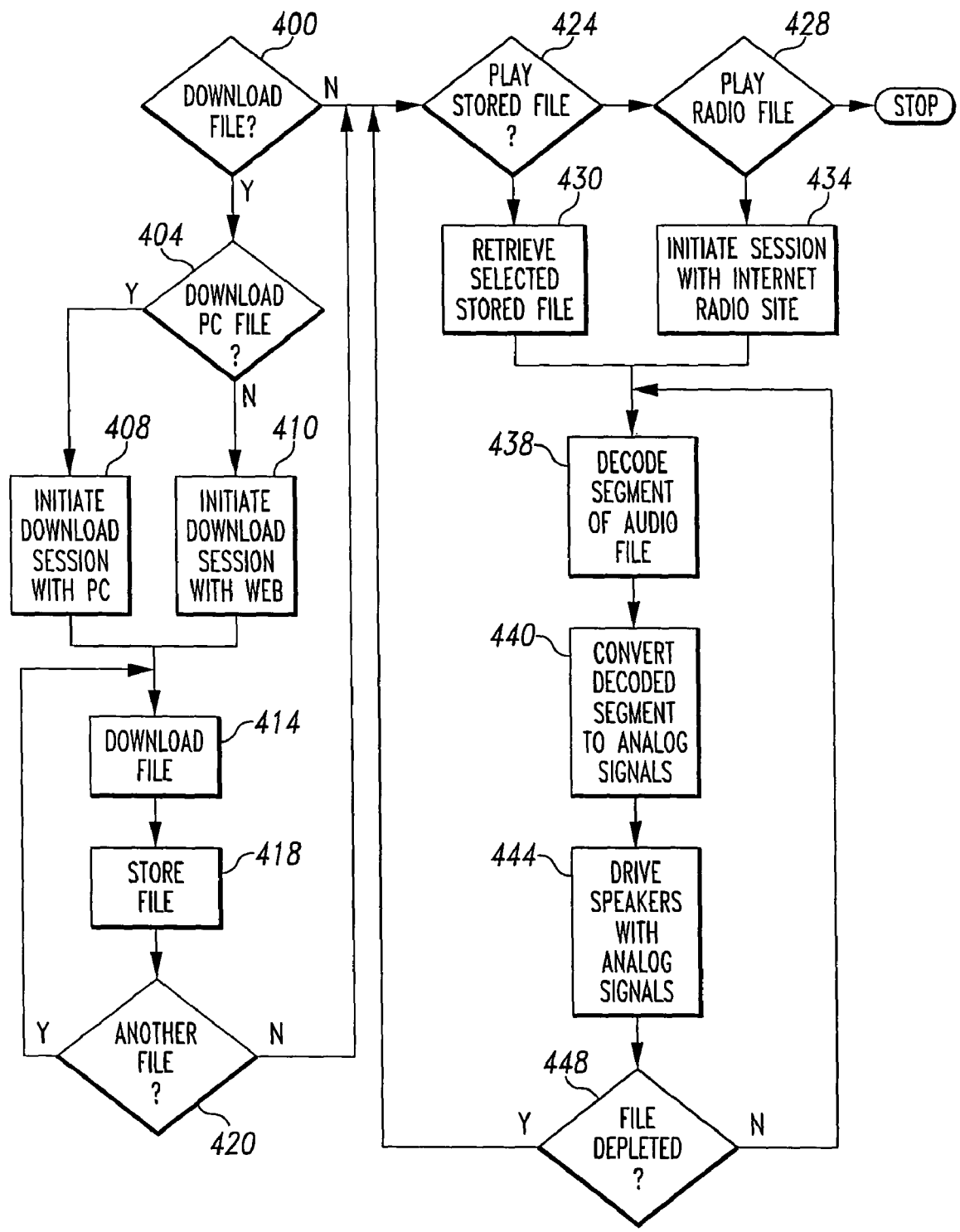
FIG. 15 is a flow diagram of a process that may be implemented to generate sound from download audio files while the terminal of the present invention is communicating through an access point.

A method that may be implemented by the audio player application program of the present invention is shown in FIG. 15. After being invoked, the method may query the user through the display as to whether the user wants to download one or more files (block 400). If a download is desired, the user is queried as to whether the download is from an external storage device, such as a PC (block 404). If so, a downloading communication session is initiated with the external storage device (block 408). Otherwise, a web site address is obtained from the user and used to initiate a communication session with a web site (block 410). During the communication session, an audio file is downloaded (block 414) and stored (block 418) in the instant messaging terminal. The method then determines whether another file is to be downloaded (block 420). If it is, then the file is downloaded and stored (blocks 414 and 418) until no more files are to be downloaded. Alternatively, a user may navigate through a series of screens that display the audio files of various content sources. These sources include external devices, such as those coupled to the LAN to which the terminal is also coupled, and devices coupled to the WAN to which the terminal is coupled through the Wi-Fi access point. The user may select one or more audio files and queue them for playing by the audio player application. In this method, audio files need not be stored on the terminal before the audio player application plays them.

After file downloads have been declined or upon completion of file downloads, the processor queries the user as to whether the user wants to play a stored audio file (block 424) or an Internet radio file (block 428). If the user does not want to hear any audio file, the process terminates. If a stored file is to be played, the selected stored file is retrieved (block 430) while a communication session with a web radio site is initiated (block 434), if streaming from an Internet radio station or other web site is desired. The process decodes a segment of either a stored audio file or received audio file (block 438). The decoded digital data is converted into analog signals (block 440) and provided to speakers or a headphone to produce an audible sound for the user (block 444). As the sound is being generated, the process determines whether the file has been depleted (block 448). If it has, it determines whether the user wants to select and play a stored file (blocks 424 to 444) or to select another radio web site (blocks 428 to 444). If the audio file for a radio station is not depleted until the user either manually terminates the communication session with the web site or the communication session is otherwise terminated.

In operation, the processor of a terminal is programmed to implement the same or similar processes to those set forth above. A user having accounts with instant messaging services may take the terminal to a hotspot or wireless home or business network and open the terminal to power on the system. The automatic scanning and testing procedures either detect and connect the terminal to a LAN through an access point or notify the user of problems with any attempts to connect. The user is given the opportunity to manually enter the network settings and the terminal attempts to connect to the LAN through the access point using the entered data. If the terminal cannot be connected then the user is informed so the network settings may be verified or the terminal moved to a location where connection to a network may be more likely.

Once the terminal is connected, the network parameters are stored in a profile for later reference in connection attempts. The user is prompted for his or her instant messaging service account data so a session may be established with one or more instant messaging services. The user may also program an association between selected emoticons and the programmable keys 78 on the keyboard 68. The user may request a buddy list identifying buddies who are logged onto the same messaging services to which the terminal is connected. The buddy list may be used to initiate conversations with one or more buddies through one or more instant messaging services. The resulting conversation windows may be managed in the manner discussed above and notification of new messages may occur through the appearance of an animated composite character or an announcement in a conversation session window. Also, should the user desire to hear music while exchanging instant messages with buddies, the audio player program may be invoked, a stored file or streaming web site, such as a radio station, may be selected, and the downloaded files converted into sound provided to the user through the terminal speakers or headphones.

If the user wants to wait for responses from buddies without consuming electrical power for the display, the user may close the terminal to place the unit in a standby mode. New messages may then be announced by blinking a status LED that is visible on the outside of the terminal case. By opening the case to expose the display, the user may view the conversation window in which the new message is displayed. Once conversations are terminated, the user may log out of the messaging accounts and end the network connection. The terminal may then be powered down until it is needed for connecting to another access point.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A handheld instant messaging terminal comprising:
   a handheld terminal housing;
   a data entry device integrated in the terminal housing, the data entry device being configured to generate textual characters and graphical symbols in response to actuation of the data entry device;
   a display mounted in the terminal housing to display textual characters and graphical symbols including the textual characters and graphical symbols generated by the data entry device;
   an Internet protocol communications module located within the handheld terminal housing to generate data messages in an Internet protocol;
   a wireless transceiver mounted within the handheld terminal housing and coupled to the Internet protocol communications module to generate wireless data messages that include the data messages in the Internet protocol, the wireless transceiver radiates the wireless data messages from an antenna coupled to the wireless transceiver; and
   a control module located within the handheld terminal housing and coupled to the Internet protocol communications module, the control module including at least one processor that executes an application program to implement at least one instant messaging protocol for generation of instant messaging (IM) data messages that are compatible with an instant messaging service, the control module providing the IM data messages that are compatible with an instant messaging service to the Internet protocol communications module to enable the IM data messages to be communicated during at least one conversation session through the Internet protocol communications module and the wireless transceiver.

2. The terminal of claim 1, the data entry device further comprising:
   a plurality of keys for graphical symbols, each graphical symbol key including indicia identifying the graphical symbol generated by depressing the key bearing the indicia; and
   at least one programmable key associated with a set of characters corresponding to a graphical symbol supported by an instant messaging service provider; and
   the control module being further configured to generate, in accordance with the at least one instant messaging protocol being implemented, a character sequence corresponding to the graphical symbol in response to the depression of the programmable key being depressed.

3. The terminal of claim 1, the control module being further configured to detect beacons received by the wireless transceiver from a plurality of wireless network access points and to prioritize the detected beacons by strength of detected signal.

4. The terminal of claim 1, the control module including memory in which a profile is stored, the profile containing network settings for a network communicating with the communications module and the wireless transceiver through a wireless network access point.

5. The terminal of claim 1, the control module being further configured to access a plurality of instant messaging service providers through the wireless network access point, to generate a buddy list identifying buddies coupled to each instant messaging service accessed by the control module and to display the buddy list on the display mounted in the terminal housing in response to a buddy list key being depressed on the data entry device.

6. The terminal of claim 5, the control module being further configured to display buddies in the buddy list with whom active conversations are being conducted before it displays the buddies with whom no active conversations are being conducted.

7. The terminal of claim 6, the control module being further configured to generate and display a conversation session window for each buddy in the displayed buddy list with whom an active conversation is being conducted.

8. The terminal of claim 7, the control module being further configured to display in each of the conversation session windows a header that identifies the buddy with whom a conversation is being conducted, a number of conversations session windows being displayed, and a total number of active conversations.

9. The terminal of claim 8, the control module being further configured to parse textual characters and graphical symbols generated with the data entry device and to confirm the generated textual characters and graphical symbols are compatible with the instant messaging service being accessed by the control module and the wireless transceiver through the wireless network access point.

10. The terminal of claim 1 further comprising:
    an audio player for generating sound from a downloaded file; and
    the control module being configured to download and store audio files in a memory within the terminal housing.

11. A method for managing wireless network access and instant messaging through a wireless access point with a handheld instant messaging terminal comprising:
    generating textual characters and graphical symbols in response to manipulation of keys on a data entry device of a handheld instant messaging terminal;
    displaying the generated textual characters and graphical symbols on a display of the handheld instant messaging terminal;
    generating data messages with the generated textual characters and graphical symbols in accordance with at least one instant messaging protocol that is compatible with an instant messaging service;

wirelessly transmitting the generated data messages to a wireless network access point through an Internet protocol communications module and wireless transceiver in the handheld instant messaging terminal; and controlling a conversation session in accordance with the at least one instant messaging protocol being implemented with a control module located within the handheld instant messaging terminal.

12. The method of claim 11, the conversation session control further comprising:

correlating a key on the data entry device with a graphical symbol in response to the key on the data entry device being depressed.

13. The method of claim 12, the conversation session control further comprising:

generating in accordance with the at least one instant messaging protocol being used to control a conversation session, a character sequence that represents the graphical symbol.

14. The method of claim 11, the conversation session control further comprising:

detecting a plurality of beacons being transmitted by a plurality of wireless network access points; and prioritizing the detected beacons by strength of detected signal.

15. The method of claim 11, the conversation session control further comprising:

storing a profile containing network settings for a network to which the handheld instant messaging terminal has connected through the wireless network access point.

16. The method of claim 11, the conversation session control further comprising:

controlling at least two conversation sessions, each conversation session being controlled with different instant messaging protocols.

17. The method of claim 11, the conversation session control further comprising:

generating an active buddy list identifying buddies sending data messages to the handheld instant messaging terminal through at least one instant messaging service provider; and displaying the active buddy list on the display of the handheld terminal in response to a buddy list key being depressed on the data entry device.

18. The method of claim 11, the conversation session control further comprising:

generating a conversation session window for each active buddy in the active buddy list, each conversation session window having a header that identifies a buddy with whom a conversation is being conducted, a number of windows being displayed, and a total number of active conversation sessions;

displaying on the display of the handheld terminal the conversation session window generated for each buddy in the active buddy list; and displaying on the display of the handheld terminal a list of buddies with whom no active conversations are being conducted after the active buddy list has been displayed.

19. The method of claim 11, the conversation session control further comprising:

parsing textual characters and graphical symbols generated with the data entry device; and confirming the entered characters are compatible with the instant messaging service associated with the buddy to whom the message is being sent.

20. The method of claim 11, the conversation session control further comprising:

receiving files from an Internet radio station through the wireless network access point;

decoding a segment of a received file in accordance with the at least one instant messaging protocol;

converting the decoded segment into an analog signal; and driving a speaker in the handheld instant messaging terminal with the analog signal to generate sound at the handheld instant messaging terminal.

* * * * *